(12) United States Patent
Nakao et al.

(10) Patent No.: US 9,060,013 B2
(45) Date of Patent: Jun. 16, 2015

(54) NETWORK SYSTEM, NETWORK RELAY METHOD, AND NETWORK RELAY DEVICE

(71) Applicant: ALAXALA Networks Corporation, Saiwai-ku, Kawasaki, Kanagawa (JP)

(72) Inventors: Yoshihiro Nakao, Kawasaki (JP); Masayuki Shinohara, Kawasaki (JP); Yoshinori Watanabe, Chigasaki (JP)

(73) Assignee: ALAXALA NETWORKS CORPORATION, Kawasaki-shi, Kanagawa (JP)

( * ) Notice: Subject to any disclaimer, the term of this patent is extended or adjusted under 35 U.S.C. 154(b) by 4 days.

(21) Appl. No.: 13/770,550

(22) Filed: Feb. 19, 2013

(65) Prior Publication Data

US 2013/0269031 A1 Oct. 10, 2013

(30) Foreign Application Priority Data

Feb. 20, 2012 (JP) ................................. 2012-034388
Nov. 21, 2012 (JP) ................................. 2012-255587

(51) Int. Cl.
*H04L 29/06* (2006.01)
(52) U.S. Cl.
CPC ........ *H04L 63/1408* (2013.01); *H04L 63/1441* (2013.01); *H04L 63/1416* (2013.01); *H04L 63/1458* (2013.01)

(58) Field of Classification Search
CPC ............ H04L 63/1458; H04L 63/1441; H04L 63/1416; H04L 63/1408
USPC ..................................................... 726/22–23
See application file for complete search history.

(56) References Cited

U.S. PATENT DOCUMENTS

| 6,738,386 | B1 * | 5/2004 | Holmqvist .................... 370/412 |
| 8,339,959 | B1 * | 12/2012 | Moisand et al. .............. 370/235 |
| 2005/0021842 | A1 * | 1/2005 | Narayanan et al. ........... 709/238 |
| 2006/0230167 | A1 * | 10/2006 | Watanabe et al. ............. 709/230 |
| 2007/0209068 | A1 * | 9/2007 | Ansari et al. .................... 726/13 |
| 2008/0080369 | A1 * | 4/2008 | Sumioka et al. .............. 370/229 |

FOREIGN PATENT DOCUMENTS

| JP | 2006314077 A | 11/2006 |
| JP | 2009529254 A | 8/2009 |

* cited by examiner

*Primary Examiner* — Harunur Rashid
*Assistant Examiner* — Sher Khan
(74) *Attorney, Agent, or Firm* — Volpe and Koenig, P.C.

(57) ABSTRACT

A history management unit within a discard determination unit manages transmission and reception packets related to a resource to be protected for each of users, and records communication history information for users high in use frequency through stateful measurement. A priority determination unit determines the priority of a communication on a per received packet basis on the basis of communication history information. A load determination unit determines a load level of the resource to be protected, and combines the load level with the priority of the communication determined on the per received packet basis. A discard rate determination unit and a packet discard unit implement forwarding processing, determine the priority of the communication on the per user basis, and discard communications low in the priority at a high ratio.

17 Claims, 19 Drawing Sheets

F I G . 4
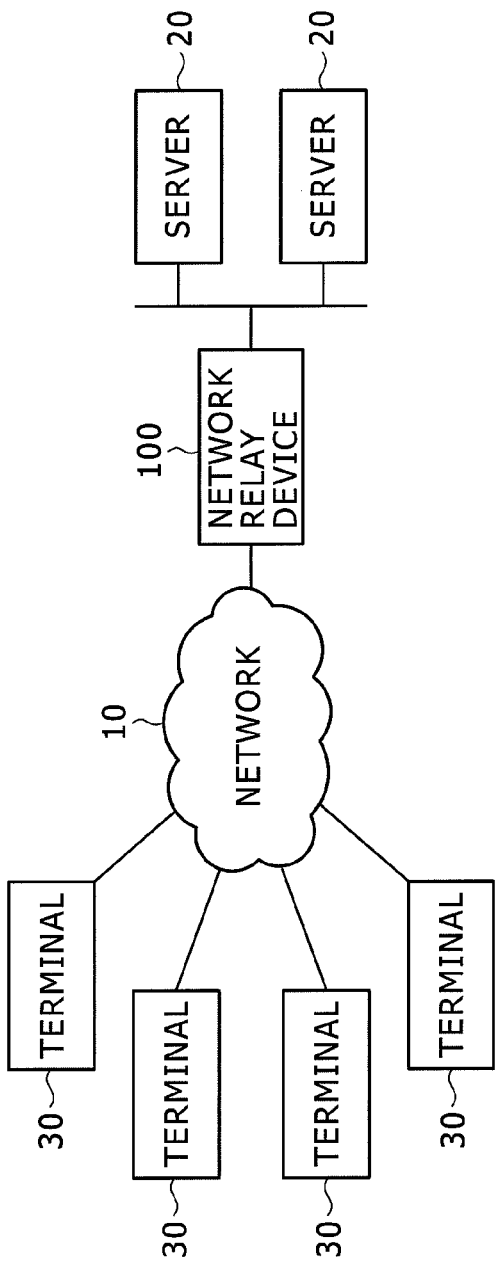

FIG. 7

| PRIORITY | LOAD LEVEL | | | | | | | | | |
|---|---|---|---|---|---|---|---|---|---|---|
| | 0-9 | 10-19 | 20-29 | 30-39 | 40-49 | 50-59 | 60-69 | 70-79 | 80-89 | 90-99 |
| 90-99 | 0 | 0 | 0 | 0 | 0 | 0 | 0 | 0 | 0 | 0 |
| 70-89 | 0 | 0 | 0 | 0 | 0 | 0 | 0 | 0 | 5 | 20 |
| 50-69 | 0 | 0 | 0 | 0 | 0 | 5 | 10 | 20 | 30 | 40 |
| 35-49 | 0 | 0 | 0 | 2 | 30 | 50 | 60 | 70 | 80 | 90 |
| 20-34 | 0 | 0 | 3 | 30 | 45 | 60 | 80 | 90 | 99 | 99.99 |
| 0-19 | 0 | 5 | 10 | 50 | 65 | 80 | 90 | 99 | 99.99 | 100 |

| | | |
|---|---|---|
| RETRIEVAL CONDITIONS | #1 | IP ADDRESS |
| | #2 | PORT NO. |
| | #3 | L7 USER ID |
| RETRIEVAL RESULTS | #1 | TRAFFIC COUNTER GROUP ON PER USER BASIS |
| | #2 | TRAFFIC COUNTER GROUP OF L7 USER ID BASIS |
| | #3 | TRAFFIC COUNTER GROUP RELATED TO ALL COMMUNICATIONS |
| | #4 | RECEPTION TIME INFORMATION |
| | #5 | EFFECTIVE RECEPTION TIME INFORMATION |
| | #6 | TRANSMISSION TIME INFORMATION |
| | #7 | DETERMINATION INFORMATION DURING CONNECTION ESTABLISHMENT |
| | #8 | DETERMINATION INFORMATION THAT IS BEING LOGGED IN |
| | #9 | SAVE ADDRESS OF COMMUNICATION HISTORY INFORMATION |

| RETRIEVAL CONDITIONS | #1 | IP ADDRESS |
| --- | --- | --- |
| | #2 | PORT NO. |
| | #3 | L7 USER ID |
| RETRIEVAL RESULTS | #1 | PRIORITY OF RECEIVED PACKET PREVIOUSLY DETERMINED |
| | #2 | DETERMINATION NOTICE OF PRIORITY USER |
| | #3 | DETERMINATION NOTICE OF GOOD/BAD USER |
| | #4 | DETERMINATION INFORMATION DURING CRYPTOGRAPHIC COMMUNICATION CONNECTION ESTABLISHMENT |
| | #5 | CRYPTOGRAPHIC COMMUNICATION CONNECTION STATUS INFORMATION |
| | #6 | DETERMINATION INFORMATION DURING TCP CONNECTION ESTABLISHMENT |
| | #7 | TCP CONNECTION STATUS INFORMATION |
| | #8 | INVALID FLAG (INFORMATION) OF CONNECTION STATUS INFORMATION |
| | #9 | DETERMINATION INFORMATION WHICH IS BEING LOGGED IN BY USER |
| | #10 | RECEPTION TIME INFORMATION |
| | #11 | VALID RECEPTION TIME INFORMATION |
| | #12 | TRANSMISSION TIME INFORMATION |
| | #13 | TRAFFIC COUNTER GROUP ON PER USER BASIS |
| | #14 | CONNECTION ESTABLISHMENT FREQUENCY COUNTER GROUP OF USER UNIT |
| | #15 | ABNORMAL TRAFFIC COUNTER GROUP ON PER USER BASIS |
| | #16 | TRAFFIC COUNTER GROUP OF L7 USER ID BASIS |
| | #17 | CONNECTION ESTABLISHMENT FREQUENCY COUNTER GROUP OF L7 USER ID BASIS |
| | #18 | ABNORMAL TRAFFIC COUNTER GROUP OF L7 USER ID BASIS |
| | #19 | TRAFFIC COUNTER GROUP RELATED TO ALL COMMUNICATIONS |
| | #20 | CONNECTION ESTABLISHMENT FREQUENCY COUNTER GROUP RELATED TO ALL COMMUNICATIONS |
| | #21 | ABNORMAL TRAFFIC COUNTER GROUP RELATED TO ALL COMMUNICATIONS |
| | #22 | SAVE ADDRESS OF COMMUNICATION HISTORY INFORMATION ON PER USER BASIS |
| | #23 | SAVE ADDRESS OF COMMUNICATION HISTORY INFORMATION OF L7 USER ID BASIS |
| | #24 | SAVE ADDRESS OF COMMUNICATION HISTORY INFORMATION RELATED TO ALL COMMUNICATIONS |

| RETRIEVAL CONDITIONS | #1 | IP ADDRESS |
| --- | --- | --- |
| | #2 | PORT NO. |
| | #3 | L7 USER ID |
| SAVE ADDRESS | | |

FIG.14

PROTECTION TARGET INFORMATION TABLE

| | CONDITIONS OF PACKET DESTINED FOR PROTECTION TARGET | | | | | PROCESSING MODULE |
|---|---|---|---|---|---|---|
| | DESTINATION IP ADDRESS | DESTINATION PORT NO. | SOURCE IP ADDRESS | SOURCE PORT NO. | PROTOCOL | |
| 1036 | .. | .. | .. | .. | .. | .. |
| 10361 | 10.0.1.1 | 80 | ALL | ALL | TCP | 110-1 |
| 10362 | 10.0.2.2 | ALL | EXCEPT 10.0.0.0/8 | ALL | TCP | 110-2 |
| | .. | .. | .. | .. | .. | .. |

FIG.15

ROUTE INFORMATION TABLE — 1037

| | DESTINATION IP ADDRESS | | FORWARDING DESTINATION MODULE/OUTPUT LINE |
|---|---|---|---|
| | IP ADDRESS | MASK | |
| | .. | .. | .. |
| 10371 | 10.0.1.1 | 24 | 1002-2/1004-2 |
| 10372 | 10.0.2.2 | 24 | 1002-2/1004-3 |
| 10373 | 10.0.0.2 | 32 | 110-1 |
| 10374 | 10.0.0.3 | 32 | 110-2 |
| 10375 | 0.0.0.0 | 0 | 1002-1/1004-1 |
| | .. | .. | .. |

FIG.16

QoS SETUP TABLE 1038

| | CONDITIONS OF PACKET TO CONTROL QoS | | | | | | QoS CONTROL CONTENTS |
|---|---|---|---|---|---|---|---|
| OUTPUT LINE | DESTINATION IP ADDRESS | DESTINATION PORT NO. | SOURCE IP ADDRESS | SOURCE PORT NO. | PROTOCOL | | |
| . . | . . | . . | . . | . . | . . | | . . |
| 1004-2 | 10.0.1.0/24 | ALL | ALL | ALL | ALL | | PRIORITY CONTROL AS PREDETERMINED PRIORITY DURING CONGESTION |
| 1004-3 | 10.0.2.0/24 | ALL | ALL | ALL | ALL | | BANDWIDTH CONTROL TO 100 Mbps |
| . . | . . | . . | . . | . . | . . | | . . |

10381, 10382

IP PACKET

INTERNALLY EXTENDED IP PACKET

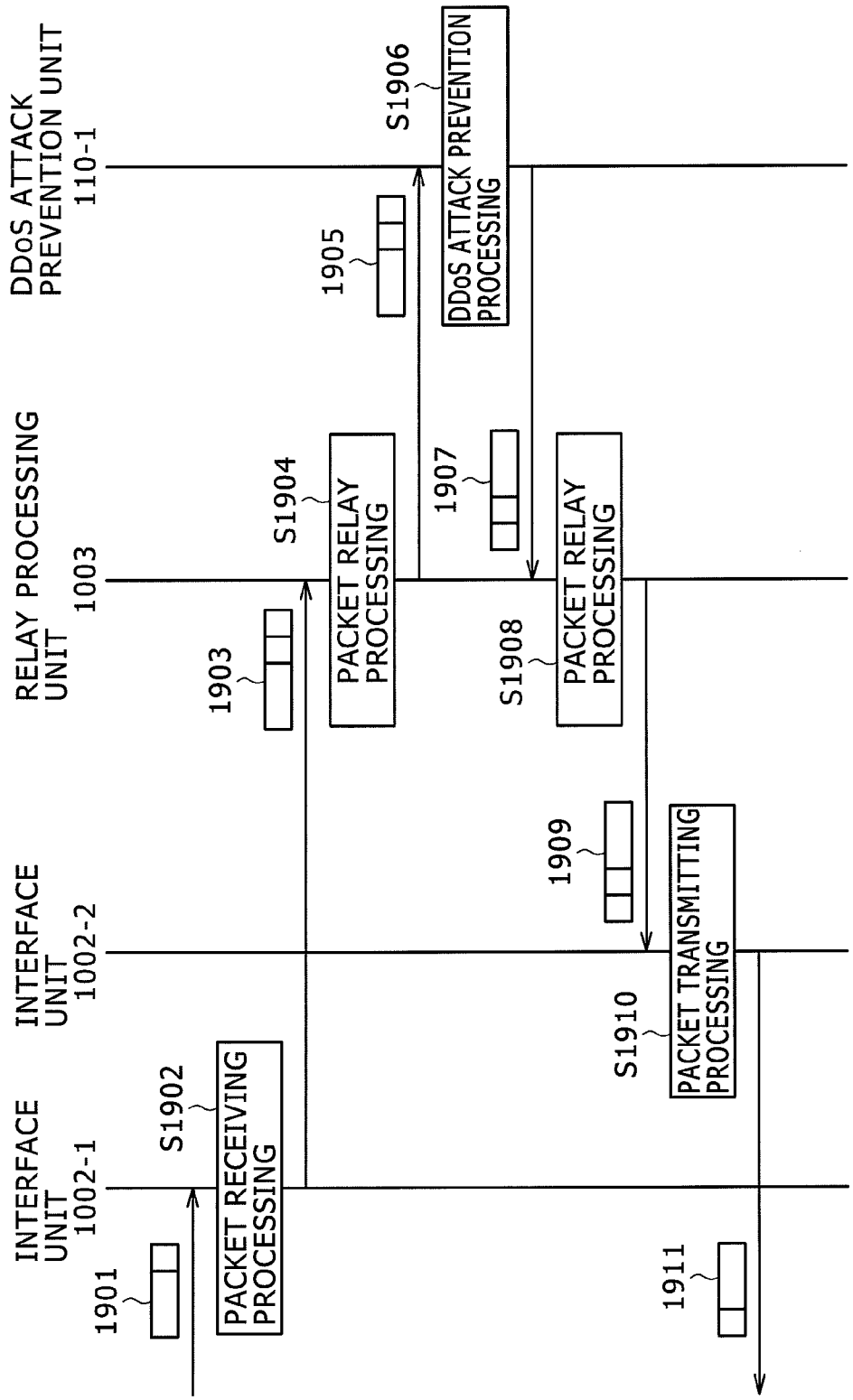

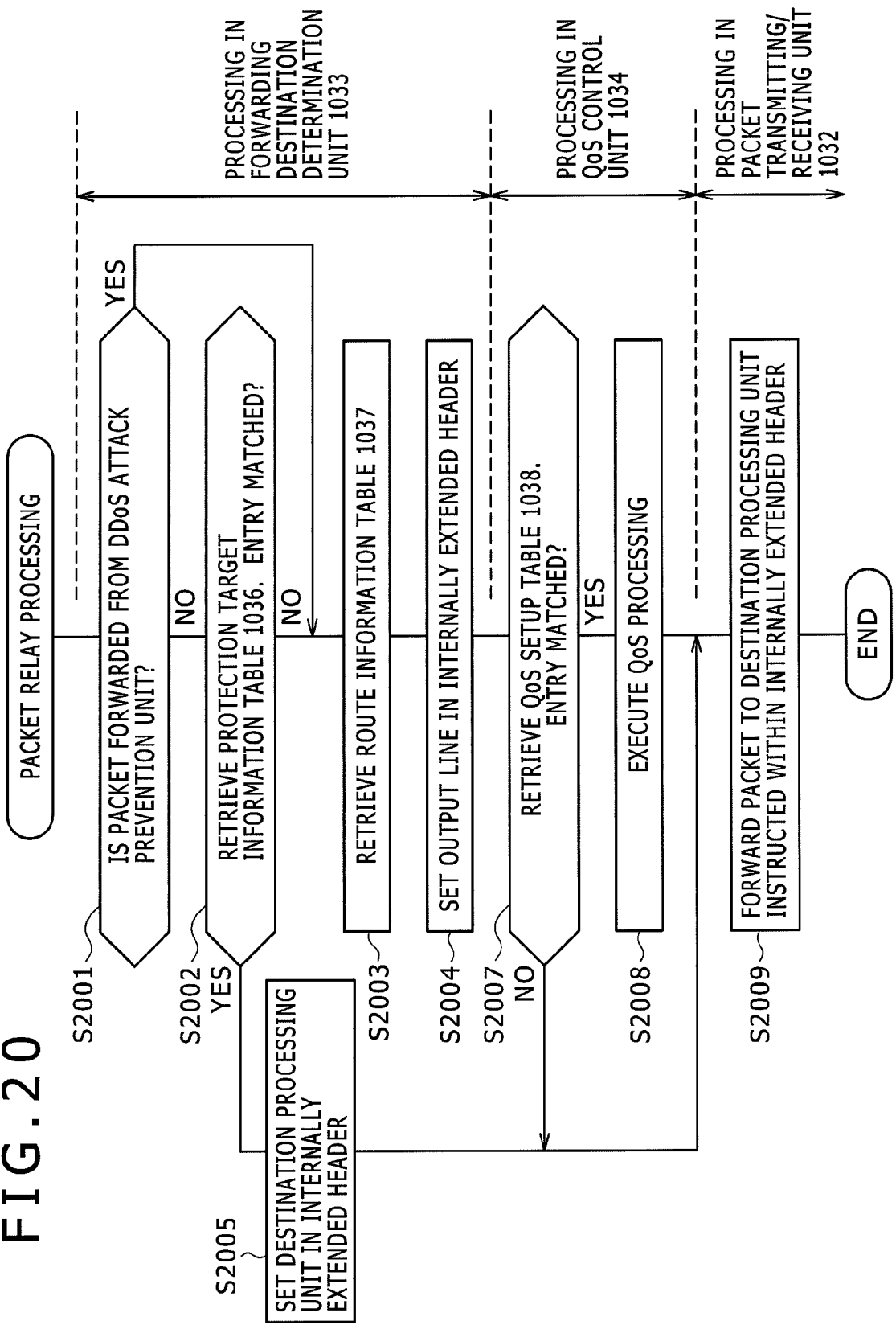

NETWORK SYSTEM, NETWORK RELAY METHOD, AND NETWORK RELAY DEVICE

CROSS-REFERENCE TO RELATED APPLICATION

The present application claims priority from Japanese Patent Application No. 2012-034388 filed on Feb. 20, 2012, and Japanese Patent Application No. 2012-255587 filed on Nov. 21, 2012 the contents of which is hereby incorporated by reference into this application.

BACKGROUND

The present invention relates to a network system, a network relay method, and a network relay device, and more particularly to a network system, a network relay method, and a network relay device, which conduct a packet discard control for invalidating a distributed denial of service (DDoS) attack.

In recent years, with the spread of an e-commerce or mission-critical communication, a significance of security securement on the Internet is increased. In particular, the appearance of a fatal denial of service attack (DoS attack) and a distributed DoS attack (DDoS attack), which is an evolutionary line of the DoS attack, gives cause for great concern for the reliability of the Internet.

The DDoS attack transmits packets which are apparently normal but actually useless to a server device that provides a user with a variety of services, to thereby excessively consume a limited system resource within the device, and deteriorate or decay the device or system to be attacked. For that reason, a normal client service given by a server to be attacked is remarkably denied. Typically, it is assumed that a resource such as a network bandwidth, a CPU cycle of a target host, or a specific TCP/IP protocol stack structure of a fragmentation buffer or a TCP SYN buffer is consumed by the DoS attack or the DDoS attack. Further, because an easily available attack script is flooded on the Internet, a technical hurdle for carrying out the DDoS attack is lowered.

In general, there has well been known that the DDoS attack is relatively simple to carry out, but difficult to defend against.

The basic reasons will be described, for example, below:
(1) IP spooling (That is, an attack packet has a source IP address normally falsified. As a result, an identity of an attack source is effectively concealed to block the effort such as detection, defense, or tracking):
(2) The distribution of DDoS attack (That is, an enormous number of sources generates attach traffics at the same time to increasingly reinforce the attack, and there arises a problem with scalability for dealing with the attack. As a result, the countermeasure is excessively strained: and
(3) There is no mechanism for allowing a victim to easily distinguish a normal packet and a fatal attack traffic from each other.

From the above viewpoints, an important target in a technical field of the network is to improve the connectibility of the network or the server with defense against the DDoS attack.

Japanese Unexamined Patent Application Publication (Translation of PCT Application) No. 2009-529254 discloses an example of a technique invented for the purpose of solving the above problems.

SUMMARY

However, the technique of Japanese Unexamined Patent Application Publication (Translation of PCT Application) No. 2009-529254 is intended to defend only a service provided by a TCP, but not intended to defend a service provided by a UDP such as a DNS server. Also, the service provided by the TCP is subjected to only an inspection method based on a behavior-based traffic differentiation (BTD), which merely determine whether to properly deal with a control signal between end points of a TCP communication. From this viewpoint, it is conceivable that the effect of this technique becomes small if a large number of attack nodes properly dealing with the control signal between the end points in the TCP communication are prepared.

While the DDoS attack patterns are increasingly diversified, the fact is that the related-art defense method does not catch up the evolution of the DDoS attack as opposed to the attack method. Most of the DDoS defense methods in the related art deal with one or two kinds of DDoS attacks, and are insufficient for extensive DDoS attack patterns. As a result, the great effects cannot be expected.

Up to now, there is no sufficient technique for coping with the case in which an enormous number of sources generate the attack traffics on the basis of the distribution of the DDoS attack at the same time. Also, when the defense method of the DDoS attack is implemented, it is assumed that "normal" traffics are also adversely affected by the defense method.

According to a first aspect of the present invention, a network system includes:
a server that has a resource to be protected, and provides a service;
an interface unit that is connected to one or more lines, and transmits or receives a packet with respect to a terminal and the server through a network;
a relay processing unit that conducts a first discard control for forwarding or discarding the packet on a per flow basis on the basis of information included in a header of the received packet; and
a DDoS attack prevention unit that conducts a second discard control for forwarding or discarding the packet on a per packet basis on the basis of a communication history on a per user basis and/or load information among the packets received by the relay processing unit through the interface unit.

According to a second aspect of the present invention, there is provided a network relay method in a network system including a server that has a resource to be protected and provides a service, a network that is connected with one or multiple terminals, and a network relay device that connects the server to the network in which the terminal accesses to the server through the network and the network relay device,
in which the network relay device includes:
an interface unit that is connected to one or more lines, and transmits or receives a packet with respect to the network and the server;
one or more DDoS attack prevention unit; and
a relay processing unit that forwards the packet between the interface unit and the DDoS attack prevention unit,
in which the relay processing unit conducts a first discard control for forwarding or discarding the packet on a per flow basis on the basis of information included in a header of the received packet, and
in which the DDoS attack prevention unit conducts a second discard control for forwarding or discarding the packet on a per packet basis on the basis of a communication history on a per user basis and/or load information.

According to a third aspect of the present invention, there is provided a network relay device that is connected to a terminal through a server having a resource to be protected and providing a service to the terminal, and a network, the network relay device including:

an interface unit that is connected to one or more lines, and transmits or receives a packet with respect to the network;

a relay processing unit that conducts a first discard control for forwarding or discarding the packet on a per flow basis on the basis of information included in a header of the received packet; and a DDoS attack prevention unit that conducts a second discard control for forwarding or discarding the packet on a per packet basis on the basis of a communication history on a per user basis and/or load information.

According to a fourth aspect of the present invention, a network system includes a server that has a resource to be protected and provides a service, a network that is connected with one or multiple terminals, and a network relay device that connects the server to the network in which the terminal accesses to the server through the network and the network relay device, in which the network relay device includes a discard determination unit that determines whether the received packet is to be forwarded or discarded, in which the discard determination unit includes:

a received packet analysis unit that determines whether the received packet is a packet which arrives at the resource to be protected, or not, and extracts user identification information for specifying a user from the received packet if it is determined that the received packet is the packet which arrives at the resource to be protected;

a history management unit that prepares and records the communication history on the per user basis from the user identification information of the received packet obtained from the received packet analysis unit, and retrieves and updates the communication history recorded on the per user basis;

a priority determination unit that determines a priority of the received packet according to a preset determination criterion on the basis of the communication history recorded on the per user basis obtained from the history management unit;

a load determination unit that determines a load state of the resource to be protected, on the basis of the load information due to the communication history recorded on the per user basis, or the load information notified from others;

a discard rate determination unit that determines a discard rate of the preset received packet according to the priority of the received packet obtained from the priority determination unit, and the load state obtained from the load determination unit; and a packet discard unit that implements a forwarding or discard determination of the packet on the basis of the discard rate of the received packet obtained from the discard rate determination unit, in which the discard control of the received packet is implemented according to the forwarding or discard determination by the discard determination unit.

According to a fifth aspect of the present invention, there is provided a network relay method in a network system including a server that has a resource to be protected and provides a service, a network that is connected with one or multiple terminals, and a network relay device that connects the server to the network in which the terminal accesses to the server through the network and the network relay device, the network relay method including:

determining whether or not the received packet is a packet which arrives at the resource to be protected;

extracting user identification information for specifying a user from the received packet if it is determined that the received packet is the packet which arrives at the resource to be protected;

preparing and recording the communication history on the per user basis from the user identification information of the received packet, and retrieving and updating the communication history recorded on the per user basis;

determining a priority of the received packet according to a preset determination criterion on the basis of the communication history recorded on the per user basis;

determining a load state of the resource to be protected, on the basis of the load information due to the communication history recorded on the per user basis, or the load information notified from others;

determining a discard rate of the preset received packet according to the priority of the obtained received packet, and the obtained load state;

implementing a forwarding or discard determination of the packet on the basis of the discard rate of the received packet; and implementing the discard control of the received packet according to the forwarding or discard determination.

According to a sixth aspect of the present invention, there is provided a network relay device in a network system including a server that has a resource to be protected and provides a service, a network that is connected with one or multiple terminals, and a network relay device that connects the server to the network in which the terminal accesses to the server through the network and the network relay device, in which the network relay device includes a discard determination unit that determines whether the received packet is to be forwarded or discarded, in which the discard determination unit includes:

a received packet analysis unit that determines whether the received packet is a packet which arrives at the resource to be protected, or not, and extracts user identification information for specifying a user from the received packet if it is determined that the received packet is the packet which arrives at the resource to be protected;

a history management unit that prepares and records the communication history on the per user basis from the user identification information of the received packet obtained from the received packet analysis unit, and retrieves and updates the communication history recorded on the per user basis;

a priority determination unit that determines a priority of the received packet according to a preset determination criterion on the basis of the communication history recorded on the per user basis obtained from the history management unit;

a load determination unit that determines a load state of the resource to be protected, on the basis of the load information due to the communication history recorded on the per user basis, or the load information notified from others;

a discard rate determination unit that determines a discard rate of the preset received packet according to the priority of the received packet obtained from the priority determination unit, and the load state obtained from the load determination unit; and a packet discard unit that implements a forwarding or discard determination of the packet on the basis of the discard rate of the received packet obtained from the discard rate determination unit, in which the discard control of the received packet is implemented according to the forwarding or discard determination by the discard determination unit.

In the present invention, the transmission and reception packets related to the resource to be protected are managed for each user, and the users high in use frequency are subjected to stateful measurement to determine the priority of the communication on the per user basis.

BRIEF DESCRIPTION OF THE DRAWINGS

FIG. 4 is a diagram illustrating an example of a network system including the network relay device according to the embodiment of the present invention;

FIG. 7 is a diagram illustrating an example of a discard rate determination table;

FIG. 8 is a diagram illustrating an example of information recorded as communication history information;

FIG. 9 is a diagram illustrating an example of information recorded as the communication history information;

FIG. 10 is a diagram illustrating an example of a table that records a save address on a per user basis therein;

FIG. 14 is an illustrative view illustrating an example of a protection target information table;

FIG. 15 is an illustrative view illustrating an example of a route information table;

FIG. 16 is an illustrative view illustrating an example of a route information table;

FIG. 19 is a sequence diagram illustrating basic processing within a network relay device according to another embodiment of the present invention; and FIG. 20 is a flowchart illustrating the operation of the relay processing unit.

DETAILED DESCRIPTION

Figure 1:
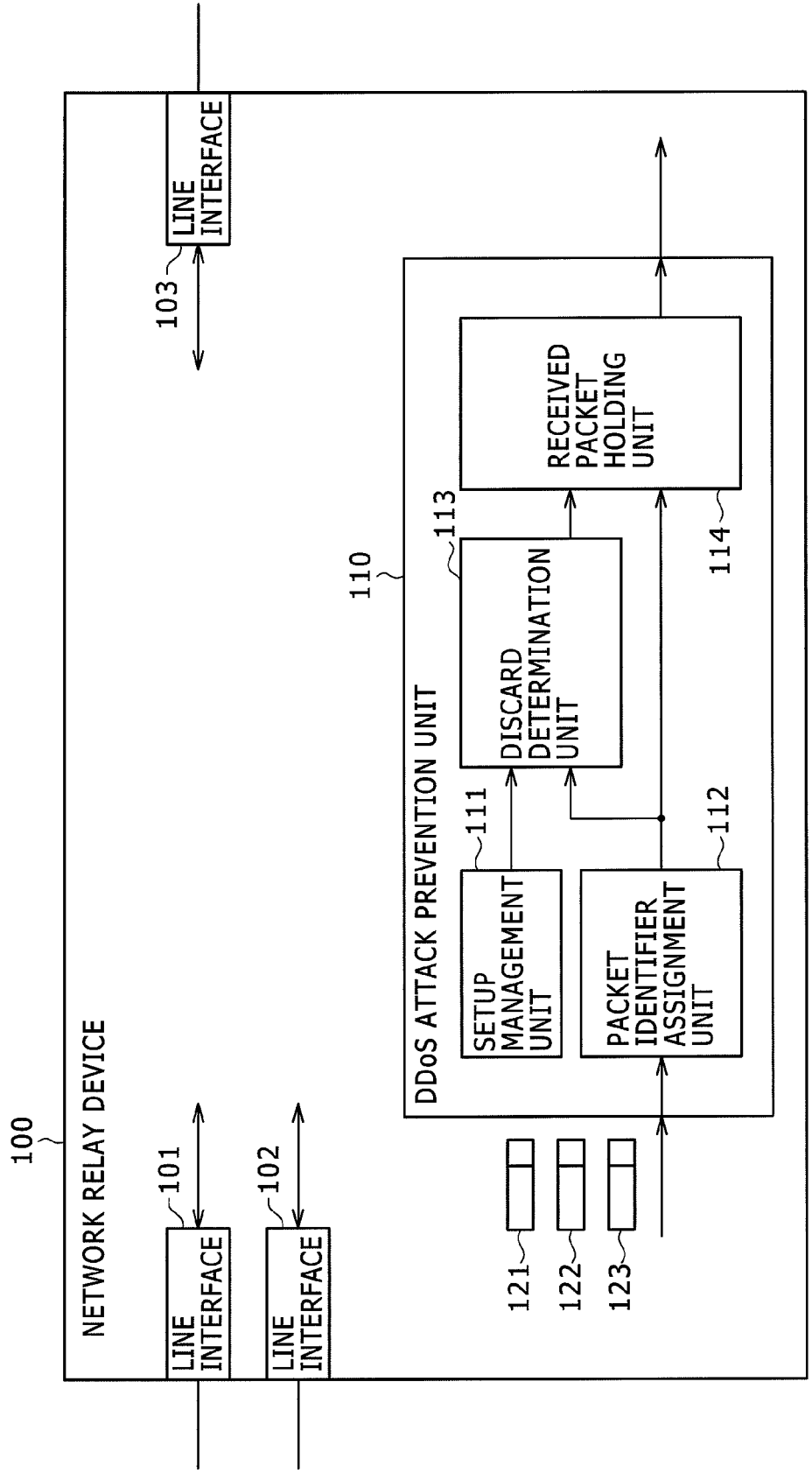
FIG. 1 is a block diagram illustrating an outline of a network relay device according to one embodiment of the present invention.
Figure 2:
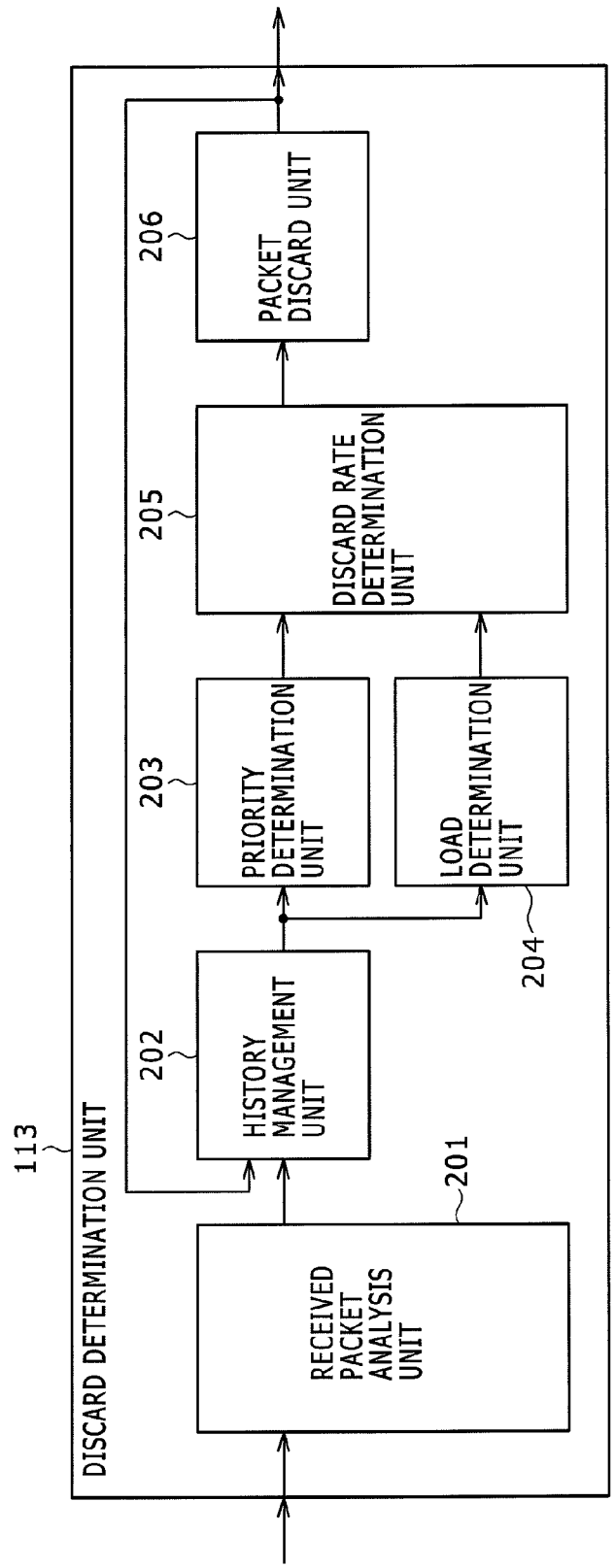
FIG. 2 is a block diagram illustrating an outline of a discard determination unit.

Embodiments exemplify the best mode for realizing the present invention. FIG. 4 illustrates environments in which a network relay device is installed. FIG. 1 illustrates a portion described in this embodiment exemplified as a configuration within the network relay device. FIG. 2 illustrates a configuration within a discard determination unit illustrated in FIG. 1, and the respective functional unit will be described. Further, FIGS. 3 and 5 to 10 illustrate constituent elements within the discard determination unit illustrated in FIG. 2. Hereinafter, the constituent elements will be described in detail.

1. Network System

FIG. 4 is a diagram illustrating an example of a network system including the network relay device according to one embodiment of the present invention. A network relay device 100 according to the embodiment of the present invention connects servers 20, which provide a variety of services to users, to a network 10 such as the Internet. The network 10 is connected with a large number or multiple terminals 30 operated by the users who use the services, and each of the terminals 30 accesses to the servers 20 through the network 10 and the network relay device 100.

The terminals 30 may include users who do not use the services appropriately, but intend to attack the servers 20. For that reason, the network relay device 100 distinguishes traffics of the users who intend to appropriately use the services from traffics of the users who intend to attach the servers 20. If a processing load of the servers 20 is increased, the network relay device 100 permits the traffics of the users who intend to appropriately use the services preferentially under the control.

Referring to FIG. 4, in this embodiment, as an example, the network relay device 100 that has multiple (three or more) lines, and determines a destination of each received packet to switch the received packet functions as a switch. Further, the network relay device 100 that has two lines, and forwards the received packet input from one line to the other line functions as a bridge. The switch described in this embodiment means all of the network relay devices 100 except for the above bridge. A router may be included in the switch assuming that routing processing is a part of switching processing.

The number of lines provided by the network relay device 100 may be logical.

In this embodiment, the servers 20 are assumed as resources to be protected. Obtainable communication history information is different depending on the kind of services provided by the servers 20, and the effects are also different. In this embodiment, the services provided by the servers 20 are classified into three kinds of:

(1) service using a connectionless communication such as a UDP;

(2) service using a connection oriented communication such as a TCP; and (3) a service of a type that logs in the service for the purpose of an e-commerce.

Mainly, "(3) the service of the type that logs in the service for the purpose of the e-commerce" will be described, and in the two other services, differences of the obtainable communication history information will be described. The present invention and this embodiment are not limited to those services, but can be applied to a variety of services.

2. Network Relay Device

FIG. 1 illustrates a configuration of the network relay device 100.

Referring to FIG. 1, the network relay device 100 has a functional unit not shown for realizing a switch function, and also has a DDoS attack prevention unit 110 that inhibits a service stop attack attributable to a DDoS attack. Input information of the network relay device 100 is a received packet of the network relay device 100, and output information is a transmitted packet that is transmitted from the network relay device 100.

In this embodiment, it is assumed that a line interface 103 among multiple lines of the network relay device 100 is a line within the device through which a packet for a resource to be protected passes.

The DDoS attack prevention unit 110 processes three kinds of received packets including a received packet 121 which is output to the line interface 103 within the device through which the packet for the resource to be protected within the network relay device 100 passes, a received packet 122 which is input from the line interface 103 within the device through which the packet for the resource to be protected within the network relay device passes, and a control packet 123 for transmitting information to the DDoS attack prevention unit 110. That is, it is assumed that a packet to be output to the line interface 103 is the received packet 121, a packet input from the line interface 103 is the received packet 122, and a control packet input to the network relay device 100 regardless of the lines is the control packet 123.

The DDoS attack prevention unit 110 implements processing on the three kinds of received packets in a discard determination unit 113, and implements forwarding processing or discard processing on the basis of forwarding or discard determination results. The DDoS attack prevention unit 110 receives the three kinds of received packets as the input information, and outputs a packet that has not been subjected to the discard processing in the DDoS attack prevention unit 110 among the three kinds of received packets, as the output information.

Referring to FIG. 1, the DDoS attack prevention unit 110 further includes the following respective units.

A setup management unit 111 that manages setup of a variety of tables within the discard determination unit 113.

A packet identifier assignment unit 112 that assigns an independent packet ID to each of the three kinds of received packets for the purpose of controlling the received packets within the DDoS attack prevention unit 110.

A discard determination unit 113 that implements a forwarding or discard determination on the three kinds of received packets.

A received packet holding unit 114 that holds the three kinds of received packets, and implements the forwarding processing or the discard processing on the basis of the determination result of the discard determination unit 113.

In this embodiment, the control packet 123 is the packet for the network relay device 100, and the received packet 122 is the packet transmitted from the resource to be protected. Therefore, since the control packet 123 and the received packet 122 are not used for the service stop attack, the control packet 123 and the received packet 122 are not to be subjected to the forwarding or discard determination, but are all subjected to the forwarding processing. In this embodiment, only the received packet 121 is to be subjected to the forwarding or discard determination.

The packet identifier assignment unit 112 receives the three kinds of received packets as the input information, and outputs the three kinds of received packets and the packet ID assigned to each of the received packets as the output information.

The discard determination unit 113 receives any one of the three kinds of received packets and the packet ID assigned to the received packet as the input information. The discard determination unit 113 outputs the packet ID assigned to the received packet, which has been subjected to the forwarding or discard determination processing by the discard determination unit 113, and the forwarding or discard determination results of the received packet in the discard determination unit 113 as the output information. Also, the discard determination unit 113 implements the setup of a variety of tables required for the forwarding or discard determination results of the received packet through the setup management unit 111.

The setup management unit 111 implements the setup of the variety of tables in the discard determination unit 113, which is implemented by a manager or a holder of the network relay device 100. When the manager of the network relay device 100 implements the control on the setup management unit 111, the manager first accesses to a central processing unit, not shown, which realizes a control function of the network relay device 100.

The discard determination unit 113 is notified of information required for the forwarding or discard determination such as load information on the protection target, a decryption key of cipher, login information on the user, or designation information on a bad user, from the external by the control packet.

Also, the manager of the network relay device 100 may set the information necessary for the forwarding or discard determination for the discard determination unit 113 through the setup management unit 111.

The received packet holding unit 114 receives the three kinds of received packets and the packet IDs assigned to the received packets as the input information from the packet identifier assignment unit 112. On the other hand, as the input information from the discard determination unit 113, the received packet holding unit 114 receives the packet IDs assigned to the received packets that have been subjected to the forwarding or discard determination processing in the discard determination unit 113, and the forwarding or discard determination results of the received packets in the discard determination unit 113. The received packet holding unit 114 outputs the packets that have not been subjected to the discard processing by the DDoS attack prevention unit 110 among the three kinds of received packets as the output information.

Each of packet transmitting/receiving units for transmitting or receiving the packet may be provided on an input side of the packet identifier assignment unit 112 and an output side of the received packet holding unit 114.

FIG. 2 illustrates a configuration of the discard determination unit 113.

The discard determination unit 113 includes a received packet analysis unit 201, a history management unit 202, a priority determination unit 203, a load determination unit 204, a discard rate determination unit 205, and a packet discard unit 206. The discard determination unit 113 implements five-level processing stated below, and implements the forwarding or discard determination of the input received packet.

As a first level, analysis processing on the received packet is implemented. The analysis processing has two functions.

As a first function, there is "the determination of the packet types". The received packet analysis unit 201 implements the analysis processing on the received packet to be input to the discard determination unit 113, and implements four kinds of "the determinations of the packet types" including "the received packet arrives at a resource to be protected", "the received packet is transmitted from the resource to be protected", "the received packet is the control packet for transmitting information to the DDoS attack prevention unit 110", and "the received packet does not correspond to any cases." The received packet analysis unit 201 may implement "the determination of the packet type", for example, on the basis of the packet ID assigned in the packet identifier assignment unit 112. In this embodiment, a target of the forwarding or discard determination is particularly a packet determined as "a packet to be transmitted to the resource to be protected".

As a second function, there is "acquisition of the analysis result" as the analysis processing of the received packet. The received packet analysis unit 201 implements "the acquisition of the analysis result" such as a reception time or a packet length of the received packet, or a variety of header information.

As a second level, a communication history is retrieved from the results of the processing of "acquiring information related to the received packet", and the information obtained by the "acquisition of the analysis results" is accumulated as the communication history.

The history management unit 202 retrieves the user from the processing results of "the acquisition of the analysis results", and acquires the communication history information if it is determined whether "the received packet is the packet to be transmitted to the resource to be protected", or "the received packet is the packet transmitted from the resource to be protected" according to "the determination of the packet type" implemented in "the first level". Also, the history management unit 202 accumulates the communication history information with the inclusion of the information related to the received packet.

In a third level, two processing is implemented in parallel.

On the other hand, the priority determination unit 203 determines the "priority of the received packet" according to the analysis results of the received packet by "the acquisition of the analysis results" and the communication history information related to the received packet.

On the other hand, the load determination unit 204 determines "the load level of the resource to be protected" according to the analysis results of the received packet by "the acquisition of the analysis results" and the communication history information related to the received packet.

As a fourth level, "the discard rate of the received packet" is determined according to "the priority of the received packet" and "the load level of the resource to be protected". In this embodiment, the discard rate determination unit 205 uniquely determines the discard rate from a discard rate determination table which will be described later.

As a fifth level, the forwarding or discard determination is implemented according to "the discard rate of the received packet". In this embodiment, the packet discard unit 206 implements the forwarding or discard determination, obtains the forwarding or discard determination results, and notifies the received packet holding unit 114 and the history management unit 202 of the forwarding or discard determination results. The discard determination unit 113 assigns the packet ID to the received packet in those five-level processing, and realizes the forwarding or discard determination.

3. Detailed Processing of the Forwarding or Discard Determination

Hereinafter, the processing of the discard determination unit 113 will be described in detail.

(1) First Level (Received Packet Analysis Unit 201)

As a first level, as described above, the received packet analysis unit 201 implements analysis processing on the packet input to the packet identifier assignment unit 112. The analysis processing is intended for "the determination of the packet type" and "the acquisition of the analysis results". The received packet analysis unit 201 receives the received packet and the packet ID as the input information, and outputs the analysis results such as the reception time or the packet length of the received packet, a variety of header information, or information on the control packet, and the packet ID, as the output information.

Figure 3:
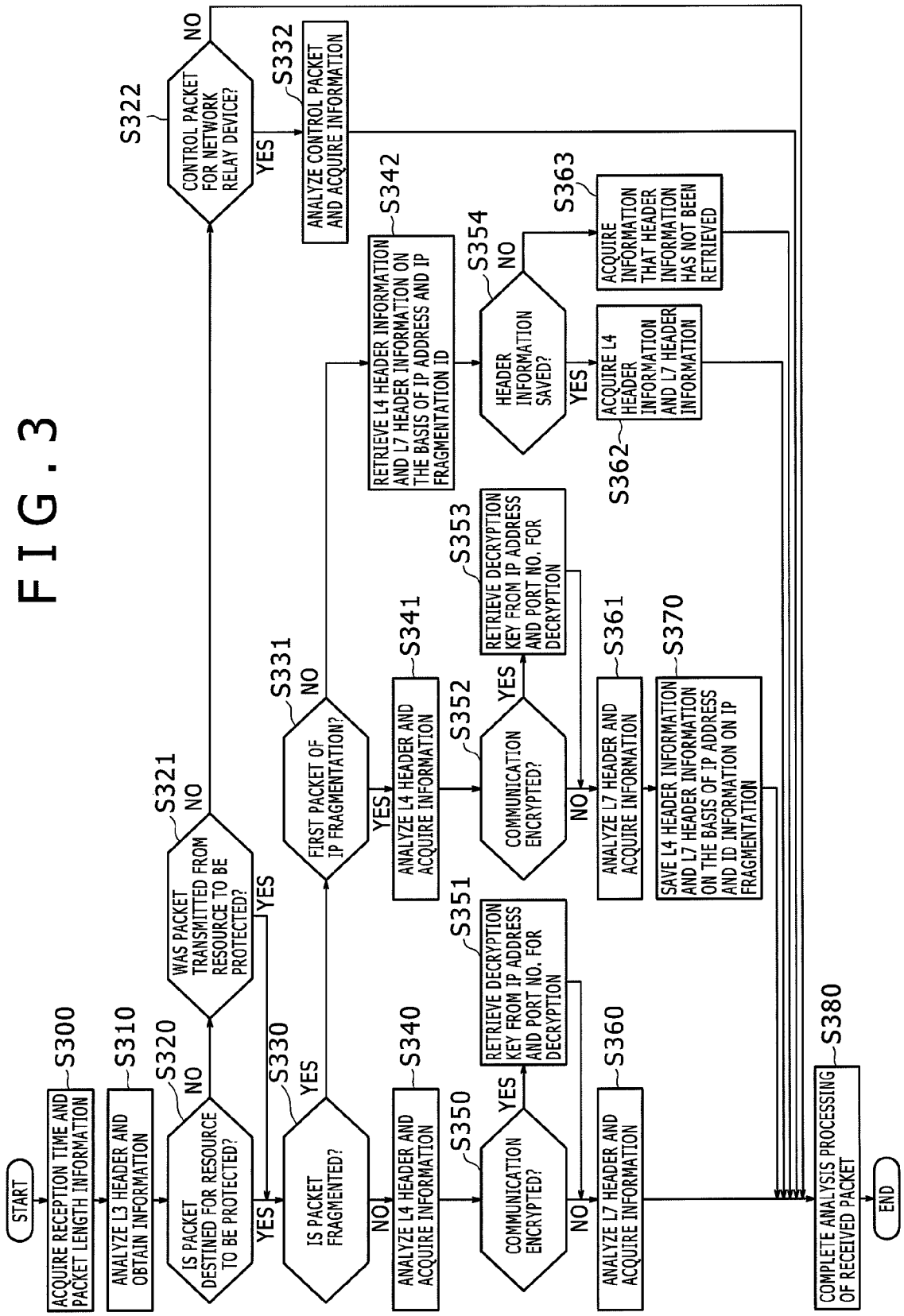
FIG. 3 is a flowchart illustrating packet processing of a received packet analysis unit.

FIG. 3 is a flowchart illustrating an example of the analysis processing of the received packet in the received packet analysis unit 201. In this embodiment, a case in which a route control using an IP address is implemented, and the encryption of a communication is implemented will be described.

In step S300, the received packet analysis unit 201 recognizes the reception of the packet, and acquires information on the reception time and the packet length of the received packet, and the processing proceeds to step S301.

In step S310, the received packet analysis unit 201 analyzes L3 (network layer) header information included in the received packet, and acquires the information related to a source, a destination IP address, or an IP fragmentation, and the processing proceeds to step S320. The information on the packet length may be determined with the use of the L3 header information.

In step S320, the received packet analysis unit 201 determines whether the received packet is destined for the resource to be protected, or not, according to the destination IP address acquired in step S310, or not. For example, a table that stores a list of the resources to be protected in advance is provided, and the received packet analysis unit 201 determines whether or not the received packet arrives at the resource to be protected, with reference to the table. If it is determined that the received packet arrives at the resource to be protected in step S320, the processing proceeds to step S330. If it is determined that the received packet is not destined for the resource to be protected in step S320, the received packet analysis unit 201 acquires information that the received packet does not arrive at the resource to be protected, and the processing proceeds to step S321.

In step S321, the received packet analysis unit 201 determines whether the received packet has been transmitted from the resource to be protected, or not, according to the source IP address acquired in step S310. If it is determined that the received packet has been transmitted from the resource to be protected in step S321, the processing proceeds to step S330. If it is determined that the received packet has not been transmitted from the resource to be protected in step S321, the received packet analysis unit 201 acquires information that the received packet has not been transmitted from the resource to be protected, and the processing proceeds to step S322.

In step S322, the received packet analysis unit 201 determines the received packet is a control packet for the network relay device 100, or not. If it is determined that the received packet is the control packet for the network relay device 100 in step S322, the processing proceeds to step S332. If it is determined that the received packet is not the control packet for the network relay device 100 in step S322, the processing proceeds to step S380.

In step S332, the received packet analysis unit 201 analyzes the received packet as a control packet for the network relay device 100, and acquires information such as the load information of the protection target, the decryption key used for decryption of the encrypted key, the login information on the user, or the designation information on the bad user, and the processing proceeds to step S380.

In step S330, the received packet analysis unit 201 determines whether the received packet is a part of the packet that has been subjected to the IP fragmentation, or not, according to the information related to the IP fragmentation acquired in step S310. If it is determined that the received packet has been subjected to the IP fragmentation in step S330, the processing proceeds to step S331. If it is determined that the received packet has not been subjected to the IP fragmentation in step S330, the processing proceeds to step S340.

In step S331, the received packet analysis unit 201 determines whether the received packet is a first packet of the IP fragmentation, and a header of an L4 (transport layer) is included in the received packet, or not, according to the information related to the IP fragmentation acquired in step S301. If it is determined that the received packet is the head packet of the IP fragmentation in step S331, the processing proceeds to step S341. If it is determined that the received packet is not the head packet of the IP fragmentation in step S331, the processing proceeds to step S342.

In step S340, the received packet analysis unit 201 analyzes the L4 header information in the received packet, and acquires source and destination port Nos., and flag information such as SYN, FIN, or ACK in a TCP, and the processing proceeds to step S350. In step S350, the received packet analysis unit 201 determines whether the received packet has been encrypted, or not. If it is determined that the received packet has been encrypted in step S350, the processing proceeds to step S351. If it is determined that the received packet has not been encrypted in step S350, the processing proceeds to step S360. In step S351, the received packet analysis unit 201 retrieves the decryption key from the decryption keys acquired in step S332 on the basis the IP address and the port No. acquired in step S340, and decrypts the received packet, and the processing proceeds to step 360. In step S360, the received packet analysis unit 201 analyzes L7 header information included in the received packet, and acquires advantageous information when protecting the service, such as information used to specify the user or information indicative of a status of the user on a server which is the resource to be protected. In general, the L7 header information has a large number of variations, and highly confidential information such as personal information may be encrypted. For that reason, when analysis is implemented in the network relay device, there is a need to provide an advanced analysis function. In this embodiment, the resource to be protected is apparent, and the network environments of the resource to be protected and a service to be provided are recognized to restrict the analysis function for obtaining the L7 header information. As a result, the L7 header information can be easily acquired. Subsequently, the processing proceeds to step S380.

In step S341, the received packet analysis unit 201 analyzes the L4 header information in the received packet, and acquires the source and the destination port Nos., and flag information such as the SYN, the FIN, or the ACK in the TCP, and the processing proceeds to step S352. In step S352, the received packet analysis unit 201 determines whether the received packet has been encrypted, or not. If it is determined that the received packet has been encrypted in step S352, the processing proceeds to step S353. If it is determined that the received packet has not been encrypted in step S352, the processing proceeds to step S361. In step S355, the received packet analysis unit 201 retrieves the decryption key from the decryption keys acquired in step S332 on the basis the IP address and the port No. acquired in step S341, and decrypts the received packet, and the processing proceeds to step 361. In step S361, the received packet analysis unit 201 analyzes the L7 header information included in the received packet, and acquires the information, and the processing proceeds to step S370. In step S370, the received packet analysis unit 201 saves information on a high-level layer of the received packet on the basis of the IP address and ID information on the IP fragmentation, which are acquired in step S341, and the processing proceeds to step S380.

In step S342, the received packet analysis unit 201 retrieves the L4 header information and the L7 (application layer) header information on the basis of the IP address and the ID information on the IP fragmentation in the L3 header information, which is acquired in step S310, and the processing proceeds to step S354.

In step S354, the received packet analysis unit 201 determines whether the information on the high-level layer such as the L4 header information or the L7 header information of the received packet has been saved, or not, on the basis of the IP address and the ID information on the IP fragmentation, which is acquired in step S342. If it is determined that the information on the high-level layer has been saved in step S354, the processing proceeds to step S362. If it is determined that the information on the high-level layer has not been saved in step S354, the processing proceeds to step S363. In step S362, the received packet analysis unit 201 acquires the L4 header information and the L7 header information according to the retrieval results, and the processing proceeds to step S380. In step S363, the received packet analysis unit 201 acquires information that the information effective as the retrieval results could not been acquired, and the processing proceeds to step S380.

In step S380, the received packet analysis unit 201 completes the packet processing.

Through the processing described above, the received packet analysis unit 201 analyzes the received packet to acquire the information on whether the received packet arrives at the resource to be protected, or not, the reception time of the received packet, the packet length, the L3 header information, the L4 header information, the L7 header information, and the information that the information on the high level layer at the time of receiving the previous received packet has not been saved among the packets determinable to be being subjected to the IP fragmentation.

In this embodiment, the determination of any case in which "the received packet arrives at the resource to be protected", or "the received packet is transmitted from the protection target" is implemented by the IP address. Alternatively, the determination conditions may include the combination of the IP address and the L4 port No. Also, the determination conditions may include a MAC address, a received physical port of the network relay device, or a received logical port of the network relay device such as a VLAN.

In this embodiment, the L4 header information and the L7 header information are saved on the basis of the IP address and the ID of the IP fragmentation, and the decryption key of a decryption communication is also saved on the basis of the IP address and the L4 port No. Alternatively, those pieces of information may be saved in a different method.

The packet processing in FIG. 3 is illustrated assuming "(3) the service of the type that logs in the server for the purpose of the e-commerce", and "(1) the service using the connectionless communication such as the UDP", or "(2) the service using the connection oriented communication such as the TCP" may employ processing different from that in FIG. 3.

(2) Second Level (History Management Unit 202)

As a second level, the history management unit 202 manages the communication history information on the received packet in any case in which "the received packet arrives at the resource to be protected", or "the received packet is transmitted from the protection target".

The history management unit 202 receives the analysis results and the packet ID as input information from the received packet analysis unit 201. On the other hand, as input information from the packet discard unit 206, the history management unit 202 receives the forwarding or discard determination results and the packet ID of the received packet. The history management unit 202 outputs the analysis results of the received packet, the communication history information related to the received packet, and the packet ID of the received packet as output information.

The history management unit 202 retrieves and acquires the communication history information for each of the users, with the use of the IP address and the port No. in the L3 header information and the L4 header information of the received packet. Also, the history management unit 202 creates and records the communication history information. In this situation, the history management unit 202 may appropriately execute acquisition or tallying of respective information, or increasing and decreasing of each counter value, which are described below.

Figure 5:
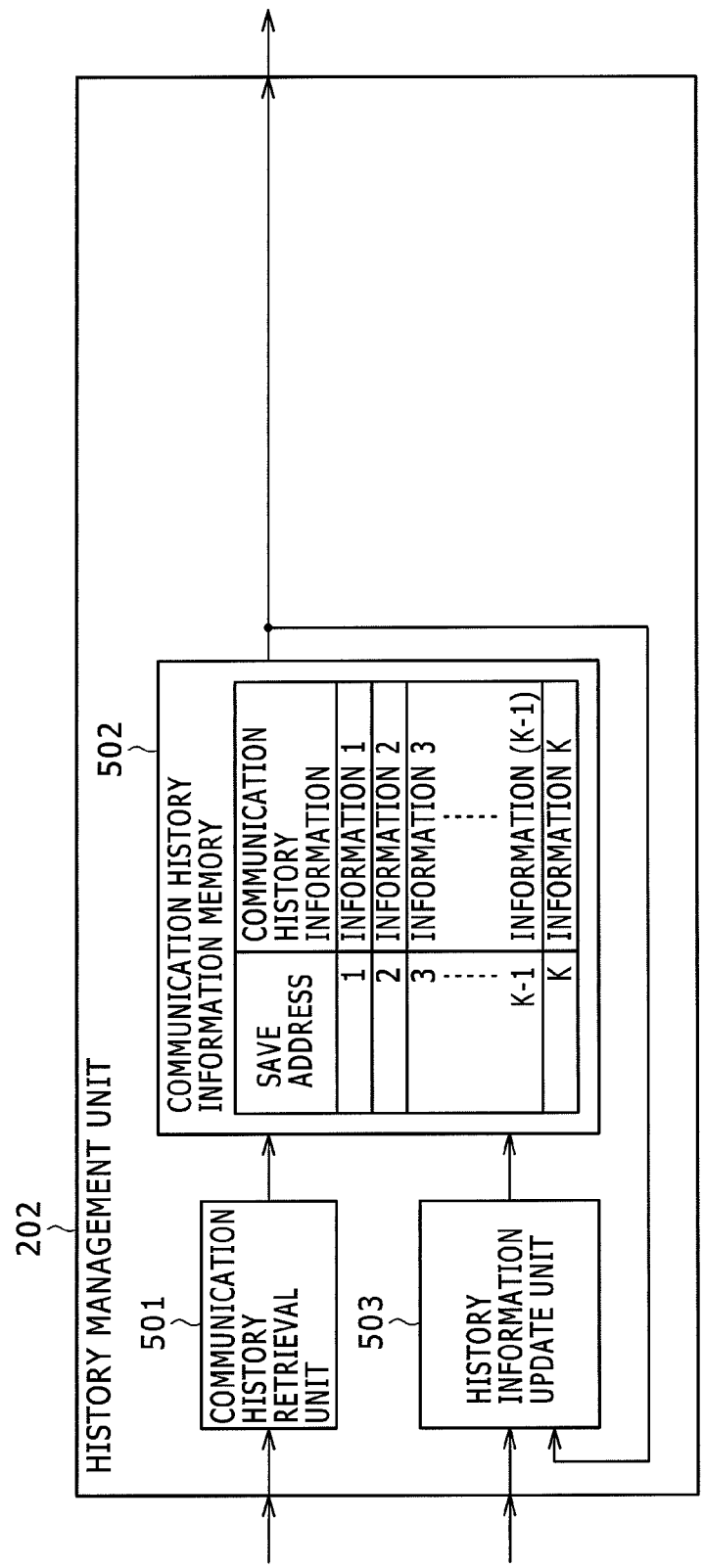
FIG. 5 is a conceptual diagram illustrating communication history information acquisition processing of a history management unit.

FIG. 5 exemplifies processing when retrieving the communication history information related to the received packet in the case where "the received packet arrives at the resource to be protected". The history management unit 202 includes a communication history retrieval unit 501, a communication history information memory 502, and a history information update unit 503, in addition to a history management function.

The history management unit 202 implements "retrieval processing", "update (record) processing", "addition (record) processing", and "deletion processing" of the communication history information entries. The history management unit 202 implements "the retrieval processing" of the communication history information entry on all of the packets at the time of receiving the packets, and implements "the update (record) processing" or "addition (record) processing" of the communication history information entries. Also, the history management unit 202 implements "the deletion processing" of the communication history information entry when the number of entries is increased.

When "the received packet arrives at the resource to be protected", the history management unit 202 acquires the information that "the received packet arrives at the resource to be protected", the reception time, the packet length, and the header information, from the analysis results of the received packet which have been implemented in the received packet analysis unit 201. The history management unit 202 identifies or specifies the user with the use of the source IP address and the source port No. from the header information on the received packet, and retrieves the communication history information for each of the users according to the source IP address and the source port No. to acquire and create the communication history information for each of the users.

In this case, for example, the communication history retrieval unit 501 retrieves a save address of user communication history information from the source IP address and the source port No. with reference to the communication history information memory 502. The communication history retrieval unit 501 acquires the user communication history information with reference to the save address on the communication history information memory 502.

The user communication history information can include an example of the communication history information (refer to communication history information 504 of FIG. 8 and communication history information 800 of FIG. 9, which will be described later), or the combination of the example of this communication history information with other information.

The history management unit 202 may create and record the communication history information by a unit such as the user ID included as the source IP address or the L7 header information, as the communication history information recorded as a specific assembly unit. Also, the history management unit 202 (communication history retrieval unit 501) may retrieve the communication history information for each of the source IP addresses with the use of the source IP address from the L3 header information of the received packet, and acquire the communication history information for each of the source IP addresses. Also, the history management unit 202 (communication history retrieval unit 501) may retrieve the communication history information for each of the user IDs with the use of information for identifying the user such as the user ID from the L7 header information of the received packet, and acquire the communication history information for each of the user IDs.

The history management unit 202 acquires or creates the communication history information on the communication for the resource to be protected as the communication history information recorded for all (or a plurality) of communications that arrive at the resource to be protected.

FIG. 8 illustrates an example of the information 504 recorded as the communication history information.

As one example, the communication history information 504 shown in the figure includes the source IP address, the source port No., and the L7 user ID as the retrieval conditions related to the packet that "the received packet arrives at the resource to be protected". Also, the communication history information 504 includes a traffic counter group on the per user basis, a traffic counter group on the per L7 user ID basis, a traffic counter group related to all of the communications that arrive at the resource to be protected, reception time information, valid reception time information, transmission time information, determination information during connection establishment, determination information which is being logged in, and the save address of the communication history information, as the retrieval results related to the packet.

Also, the history management unit 202 can add the communication history information as a new entry if no existing communication history information is present when retrieving the communication history information. In this situation, the history management unit 202 can appropriately set the save address for the communication history information. Also, if the number of entries of the communication history information is increased, the entries low in the retrieval frequency, or the determined priority of the received packet which is closer to a default may be deleted preferentially. The assignment of the save address may be "one entry to one address". The communication history information can have classification of "per user basis", "per specific assembly basis", or "all of the communications that arrive at the resource to be protected" basis, and those three kinds of classifications may be processed at the same time.

FIG. 10 illustrates an example of the table that records the save address on the per user basis. The history management unit 202 may appropriately set the save address, and save a correspondence between information (retrieval conditions) for identifying the user and the save address in a table shown in the figure when creating and recording the communication history information. The history management unit 202 retrieves the save address already recorded with reference to this table on the basis of the source IP address and the source port No. when retrieving the communication history information.

If "the received packet has been transmitted from the resource to be protected", the history management unit 202 (communication history retrieval unit 501) retrieves the communication history information for each of the users with the use of the source IP address and the source port No. when retrieving the communication history information related to the received packet to acquire the communication history information for each of the users.

The history information update unit 503 updates the communication history information on the communication history information memory 502. The history management unit 202 (history information update unit 503) updates the respective communication history information acquired by the history management unit 202, taking the analysis results of the received packet and the forwarding or discard determination results of the received packet into account. If the received packet is discarded as a result of the forwarding or discard determination of the packet, the traffic information for the received packets may not be included in the respective communication history information. In the communication history for each of the users, the information may not be updated even in a communication state, or that the information on the communication state is invalid may be recorded as the communication history information. The priority of the received packet used for the forwarding or discard determination of the packet may be recorded in the communication history information for each of the users.

Subsequently, information recorded as the communication history information will be exemplified.

In "(3) the service of the type that logs in the server for the purpose of the e-commerce", any one, a plurality, or all of the following items can be recorded as the communication history information.

That is, the items include:

the priority of the received packet which has been determined previously;

the determination notification of the priority user notified from the resource to be protected;

the determination notification of good users and bad users notified from the resource to be protected;

the determination information during the connection establishment in a cryptographic communication such as an SSL/TLS or in a connection oriented communication such as a TCP;

information of the communication state such as status information in the middle of the connection establishment in the cryptographic communication such as the SSL/TLS or in the connection oriented communication such as the TCP;

information indicating that the information of the communication state such as the status information is invalidated by the packet discard;

the determination information that is being logged in by the user notified from the resource to be protected;

the reception time information for recording a time at which the packet that "the received packet arrives at the resource to be protected" has been received;

the valid reception time information for recording a time at which the forwarded packet among the packets that "the received packet arrives at the resource to be protected" has been received;

the transmission time information for recording a time at which the packet that "the received packet has been transmitted from the resource to be protected" has been received;

a traffic counter that measures a traffic such as the number of packets or the number of bytes;

a connection establishment frequency counter that measures the number of establishment of connections in the connection oriented communication; and an abnormal traffic counter that measures a communication such as a communication for a service not provided by the resource to be protected, a communication that violates order processing in the connection oriented communication, a communication that violates a control of a fragment offset in a target packet of IP fragmentation, or a communication that is determined to be no normal communication by a specific service or data pattern.

FIG. 9 illustrates an example of the information 800 recorded as communication history information.

In this example, the information recorded as the communication history information is assumed to be recorded in "(3) the service of the type that logs in the server for the purpose of the e-commerce", and in "(2) the service using the connection oriented communication such as the TCP", the above-mentioned determination information that is being logged in by the user cannot be recorded.

Also, in "(1) the service using the connectionless communication such as the UDP", the above-mentioned determination information during the connection establishment, the above-mentioned information of the communication state such as the status information in the middle of the connection establishment, the above-mentioned information indicating that the information of the communication state is invalidated, the above-mentioned determination information that is being logged in by the user, and the above-mentioned connection establishment frequency counter cannot be recorded.

Each of the above-mentioned traffic counter, connection establishment frequency counter, and abnormal traffic counter may record a variation in numerical number for each time with the provision of multiple measurement counters different in measurement time.

Subsequently, processing when multiple measurement counters is provided will be exemplified.

First, 13 counters for measuring at five minute intervals are provided. The counters that measure at the five minute intervals change a counter to be added on the basis of a reception time of the received packet. As a result, information from the present five minutes to the past 60 minutes at the minimum can be recorded at the five time intervals.

Second, six counters for measuring at 60 minute intervals are provided. 12 counters complete measurement for 60 minutes except for the counter that measures the present five minutes among the above-mentioned counters that measure at the five intervals. Therefore, information of 60 minute intervals can be recorded by recording a total of the 12 measurement counters having the five minute intervals in a time divided for each 60 minutes.

Third, four counters for measuring at six hour intervals are provided. The above-mentioned six counters that measure at the 60 minute intervals complete measurement for six hours. Therefore, information of six hour intervals can be recorded by recording a total of the six measurement counters having 60 minute intervals in a time divided for each 60 hours.

Fourth, seven counters for measuring at 24 hour intervals are provided. The above-mentioned four counters that measure at the 6 hour intervals complete measurement for 24 hours. Therefore, information of 24 hour intervals can be recorded by recording a total of the four measurement counters having 6 hour intervals in a time divided for each 24 hours. Likewise, recording of further longer time intervals may be conducted.

The information for past seven days at the maximum can be recorded through the above-mentioned first to fourth processing.

Also, the present time interval may be measured except for the above-mentioned measurement counter of the five minute intervals.

When the received packet is the control packet for this network relay device, and includes information such as the priority user determination result of a specific user or the determination result which is being logged in, the communication history information for each of the users may be retrieved, and the communication history information may be updated.

Thus, the history management unit 202 retrieves the communication history information on the basis of the information on the received packet, and updates the communication history information as occasion demands.

(3) Third Level (Priority Determination Unit 203, Load Determination Unit 204)

As a priority determination in a third level, the priority determination unit 203 determines the priority of the received packet on the basis of the communication history information related to the received packet, which is acquired by the history management unit 202.

Further, the priority determination unit 203 may combine the communication history information related to the received packet, which is acquired by the history management unit 202, with the analysis result of the received packet, which is implemented by the received packet analysis unit 201 to determine the priority of the received packet.

The priority determination unit 203 receives the information acquired from the analysis results of the received packet, which is implemented by the received packet analysis unit 201, the communication history information of the received packet, and the packet ID of the received packet, as the input information. The priority determination unit 203 outputs the priority of the received packet and the packet ID of the received packet, as the output information.

Subsequently, the processing implemented by the priority determination unit 203 will be described.

The determination of the priority is conducted by inputting the communication history information related to the received packet and the information on the packet to a determination expression having the determination conditions, and determining whether the determination result of the determination expression is satisfied, or not.

In the determination expression, a case where the determination result is satisfied is set as "1", a case where the determination result is not satisfied is set as "0", and a product of 1 or 0 and the significance of the determination result is taken as a determination value. If the determination result is not satisfied, the determination value becomes "0". It is assumed that the priority is obtained by adding the determination value to a default of the priority. Because the significance of the determination result may have a negative value, a value of the priority may be high or low.

Further, multiple determination expressions may be used when determining the priority of the received packet.

Even when the multiple determination expressions are used, each significance of the determination results may be set to an arbitrary value.

The significance of the determination result may be changed even during forwarding of the packet. It is assumed that the determination of the priority may be calculated by adding the significance of the determination result on the basis of the priority of the received packet determined previously, which has been saved as the communication history information.

Subsequently, a negative value of the significance as the determination expression will be exemplified.

A value of the traffic counter which currently counts among the traffic counters that measure at five minute intervals is larger than 200% of values indicated by the other counters.

The value of the traffic counter which currently counts among the traffic counters that measure at five minute intervals is larger than 500% of values indicated by the other counters.

The value of the traffic counter which currently counts among the traffic counters that measure at five minute intervals is larger than 2400% of values of the other counters that measure at 60 minute intervals.

The value of the traffic counter which currently counts among the traffic counters that measure at five minute intervals is larger than a threshold value set within the network relay device.

A value of the connection establishment frequency counter which currently counts among the connection establishment frequency counters that measure at five minute intervals is larger than 200% of values indicated by the other counters.

A difference between the reception time information for recording a time at which the packet is received and the reception time information acquired from the communication history information is larger than a threshold value.

The difference between the reception time information for recording the time at which the packet is received and the reception time information acquired from the communication history information is smaller than a threshold value.

A value of the current traffic counter that measures, at five minute intervals, the communication history information for each of the user IDs retrieved from the user IDs that can be acquired as the L7 header information provided in the received packet is larger than 50% of the value of the current traffic counter that measures, at the five minute intervals, the communication history information of the communication for the resource to be protected.

Further, it is assumed that the threshold value or the rate used when comparing the respective measurement counters may have multiple values for the respective determinations.

In this embodiment, when the traffic counters are compared with each other in the communication history information for each of the users, if the DDoS attack occurs, the user who joins the attack can be estimated even when a single traffic is small.

Subsequently, a positive value of the significance as the determination expression will be exemplified.

It is found that the user who transmits the received packet from the communication history information and the resource to be protected are establishing the connection.

It is found that the user that transmits the received packet from the communication history information is logging in the resource to be protected.

It is found that the user who transmits the received packet from the communication history information is the priority user.

Figure 6:
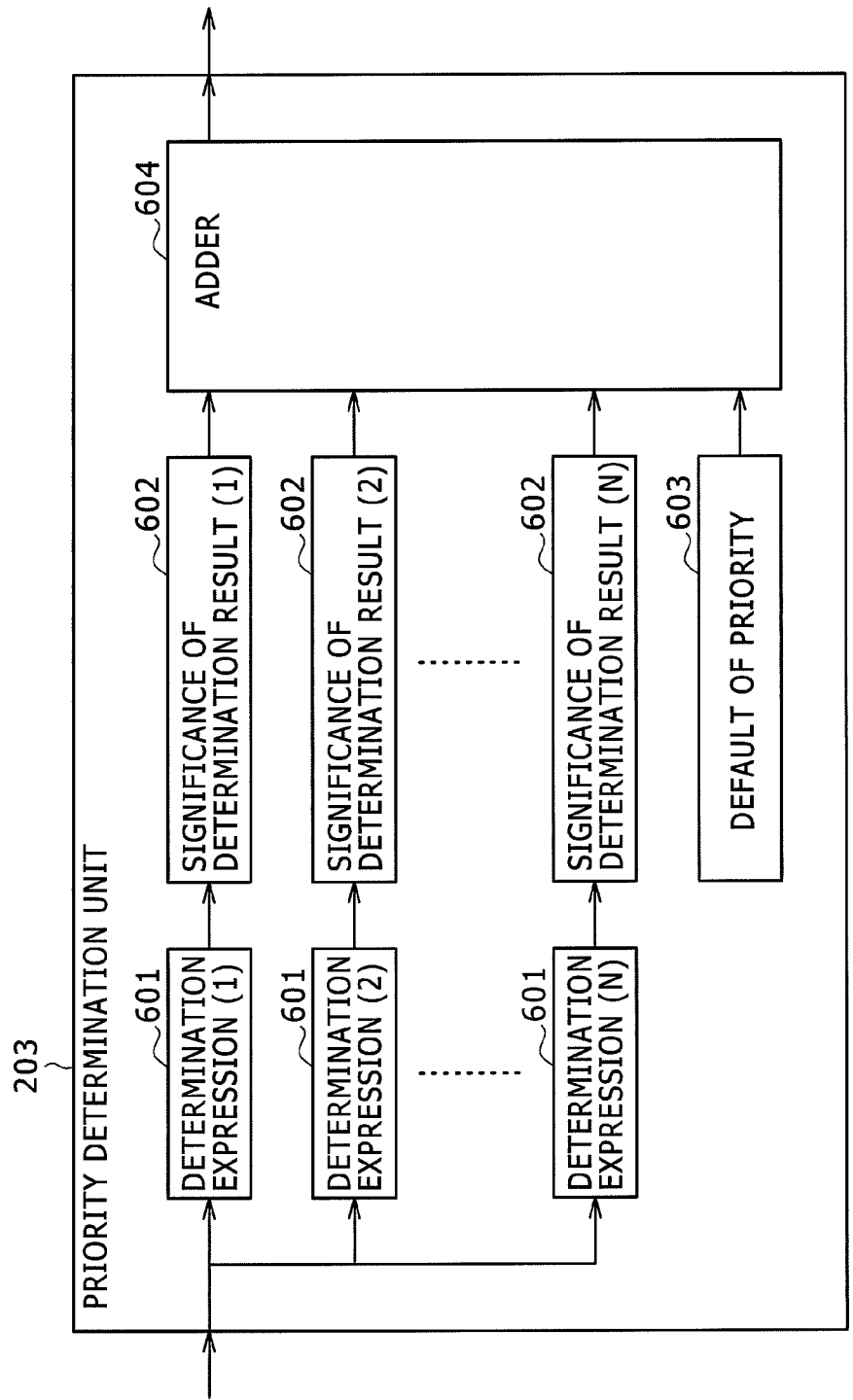
FIG. 6 is a conceptual diagram illustrating priority determination processing of a priority determination unit.

FIG. 6 illustrates an example of the priority determination of the received packet in the priority determination unit. FIG. 6 illustrates determination expressions (1) to (N) 601, significances of the determination results (1) to (N) 602, a default of the priority 603, and an adder 604. It is assumed that the significances of the determination results (1) to (N) 602 which are "the significance of the determination results when determining the priority", and the default of the priority 603 may be changed by the manager of the network relay device through the setup management unit 111 even during forwarding of the packet. The communication history information and the information on the packets are input to the determination expressions (1) to (N) 601. The determination values are calculated according to the determination expressions (1) to (N) 601 and the significances of the determination results (1) to (N) 602. The adder 604 outputs a value obtained by adding the default of the priority 603 and the determination value as the priority of the received packet.

In this embodiment, a description will be given below of an example in which five determination expressions are used, the priority is set to 100 levels, and the default of the priority 603 is set as "50". In the determination of the priority, the communication history information for each of the users, which is determined according to the source IP address and the source port No., the communication history information for each of the user IDs, which is acquired from the L7 header information, and the communication history information of the communication for the resource to be protected are used as the communication history information.

The determination expression (1) is used as follows. "The value of the traffic counter which currently counts among the traffic counters that measure at five minute intervals is larger than 200% of values indicated by the other counters." Further, the significance (1) of the determination result is set to "−10".

The determination expression (2) is used as follows. "The value of the traffic counter which currently counts among the traffic counters that measure at five minute intervals is larger than 500% of values indicated by the other counters." Further, the significance (2) of the determination result is set to "−10".

The determination expression (3) is used as follows. "The value of the current traffic counter that measures, at five minute intervals, the communication history information for each of the user IDs retrieved from the user IDs that can be acquired as the L7 header information provided in the received packet is larger than 50% of the value of the current traffic counter that measures, at the five minute intervals, the communication history information of the communication for the resource to be protected." Further, the significance (3) of the determination result is set to "−60".

The determination expression (4) is used as follows. "It is found that the user who transmits the received packet from the communication history information and the resource to be protected are establishing the connection." Further, the significance (4) of the determination result is set to "+5".

The determination expression (5) is used as follows. "It is found that the user that transmits the received packet from the communication history information is logging in the resource to be protected." Further, the significance (5) of the determination result is set to "+20".

In this example, if the determination expressions (1), (3), (4), and (5) are satisfied, the determination value (1) becomes "−10", the determination value (2) becomes "0", the determination value (3) becomes "−60", the determination value (4) becomes "+5", the determination value (5) becomes "+20", and the default of the priority 603 is "50". Therefore, the priority of the received packet becomes "5" by adding those values in the adder 604.

Thus, the priority determination unit 203 obtains the determination value according to the determination result of the determination expression and the significance of the determination result, and adds the determination value to the default of the priority to determine the priority of the received packet.

As a load level determination of the third level, the processing implemented by the load determination unit 204 will be described. The load determination unit 204 determines the load state of the resource to be protected. The load determination unit 204 receives the information acquired from the analysis result of the received packet, which is implemented by the received packet analysis unit 201, the communication history information of the received packet, and the packet ID of the received packet, as the input information. The load determination unit 204 outputs the load level as the output information.

Further, the load determination unit 204 holds the information on the current and past load levels in addition to the input information, and determines the load level with reference to the held information.

Hereinafter, a specific load determination method will be described with six examples.

First Example: Method of Determining Response Speed

The user is determined when receiving the packet from the resource to be protected, and "a reception time of the packet from the resource to be protected" is compared with "a last reception time of the packet for the resource to be protected" on the communication history for each of the users which is recorded for the user of the packet from the resource to be protected, to determine the user according to a difference of the reception time. In this determination, one or more threshold values are provided, and it is determined that the load is high if the load exceeds the threshold value, and the load is determined according to the significances set for the respective determination results.

Second Example: Method of Determining the Number of Connections

The number of connection of the resources to be protected is determined on the basis of the communication history output from the history management unit in a state where the user is specified every time the received packet 121 for the resource to be protected and the received packet 122 for the resource to be protected are received. In this determination, one or more threshold values are provided, and if the number of connection of the resources to be protected exceeds the threshold value, the load is determined according to the significances set for the respective determination results.

Third Example: Method of Determining the Number of Forwarding Packets

At least one of the number of packets for the resource to be protected and the number of packets from the resource to be protected is measured for each time to determine the number of forwarding packets. In this determination, one or more threshold values are provided, and if the number of forwarding packets exceeds the threshold value, the load is determined according to the significances set for the respective determination results.

Fourth Example: Method of Notifying the Load from the Management Server

"The management server that determines the load state of the resource to be protected" is provided inside or outside the network relay device, and the control packet that notifies the load information from the management server is forwarded to the network relay device, and the load is notified and determined from the analysis result of the control packet.

The management server may be provided within the resource to be protected.

Further, it is assumed that the determination examples of the above-described first example to third example may be determined by the management server in the fourth example, and notified with the use of the control packet.

Fifth Example: Method of Recording the Load Level

The load determination unit 204 continues to output the load level to a downstream discard rate determination unit.

In this load determination method, a further higher load level is determined if a state in which the load of the resource to be protected is high is continued in the state where the load level is high, by taking the current load level into account, in addition to the determination results of the other load determination methods.

Sixth Example: Method of Setting the Load Level

Unlike the load determination methods of the first example to the fifth example, the manager of the network relay device directly sets the load level through the setup management unit.

Further, like "the significance of the determination result when determining the priority" of the priority determination unit 203, the load determination unit 204 has a load determination significance table that can set the significance of those determination results, and can change a rule of the load determination with values on the table as "the significance of the determination results when determining the load level", even while the network relay device is operating. The manager of the network relay device may change the load determination significance table through the setup management unit 111 even during forwarding of the packet.

(4) Fourth Level (Discard Rate Determination Unit 205)

As a fourth level, the processing implemented by the priority determination unit 203 will be described.

The discard rate determination unit 205 determines the discard rate of the received packet on the basis of the priority of the received packet for the resource to be protected, which is determined by the priority determination unit 203, and the load state (load level) of the resource to be protected, which is determined by the load determination unit 204. The discard rate determination unit 205 receives the priority of the received packet and the packet ID of the received packet as the input information from the priority determination unit 203, and receives the load level from the input information from the load determination unit 204. The discard rate determination unit 205 outputs the discard rate of the received packet and the packet ID of the received packet as the output information.

The discard rate determination unit 205 has a discard rate determination table for the purpose of uniquely determining the discard rate according to the priority of the received packet for the resource to be protected, and the load state of the resource to be protected.

FIG. 7 exemplifies a discard rate determination table 700 when the priority determination and the load level are each set to 100 levels. It is assumed that values on the discard rate determination table 700 can be arbitrarily set as "the discard rate determined according to the priority and the discard level". "The discard rate determined according to the priority and the discard level" is described on percentage as an example. Further, the manager of the network relay device may change the values on the discard rate determination table 700 through the setup management unit 111 even during forwarding of the packet.

(5) Fifth Level (Packet Discard Unit 206)

As a fifth level, the processing implemented by the packet discard unit 206 will be described.

The packet discard unit 206 implements the forwarding or discard determination of the packet on the basis of the discard rate of the received packet which is determined by the discard rate determination unit 205. The packet discard unit 206 receives the discard rate of the received packet and the packet ID of the received packet as the input information, and outputs the forwarding or discard determination result of the received packet and the packet ID of the received packet as the output information.

The above processing of the five levels is implemented, and the discard determination unit 113 implements the forwarding or discard determination of the received packet. Because the discard determination unit 113 processes the received packet with the addition of the packet ID, the received packet holding unit 114 implements the forwarding processing or the discard processing on the held received packet on the basis of the forwarding or discard determination result of the received packet and the packet ID of the received packet.

4. Supplement

As described above, in this embodiment, the history management unit 202 within the discard determination unit 113 manages the transmission and reception packets related to the resource to be protected for each of the users, and records the communication history information for users high in use frequency through stateful measurement. Also, the priority determination unit 203 determines the priority of the communication on the per received packet basis on the basis of the communication history information. Further, the load determination unit 204 determines the load level of the resource to be protected, and combines the load level with the priority of the communication, which is determined on the per received packet basis. As a result, the load determination unit 204 implements the forwarding processing even on the user low in the priority including the attacker in the state where the load of the resource to be protected is low, determines the priority of the communication on the per user basis according to the communication history accumulated by recording and the received packet in the state where the load of the resource to be protected is high, and can discard the communication low in the priority at a high rate.

The communication high in the priority is forwarded at the high rate, and the communication low in the priority is discarded preferentially to reduce the load of resource to be protected. In addition, with the development of a mechanism that can change "the significance of the determination result when determining the priority", "the significance of the determination result when determining the load level", and "the discard rate determined according to the priority and the discard level" even during forwarding of the packet, a method of coping with an unknown DDoS attack is realized.

This embodiment has the advantages of solving "the problem that there is no sufficient technique of coping with the advanced DDoS attack in the related art", and also solving "the problem that the "normal" traffic is erroneously determined as the attack pattern, and adversely affected, which occurs in association with the determination of the attack pattern which frequently occurs in the related art".

Also, this embodiment has the advantage of solving "the problem that there is no sufficient technique for coping with the case in which an enormous number of sources generate the attack traffics on the basis of the distribution of the DDoS attack at the same time".

5. Other Embodiments of the Present Invention

Other embodiments of the present invention will be described with reference to FIGS. 11 to 20.

Figure 11:
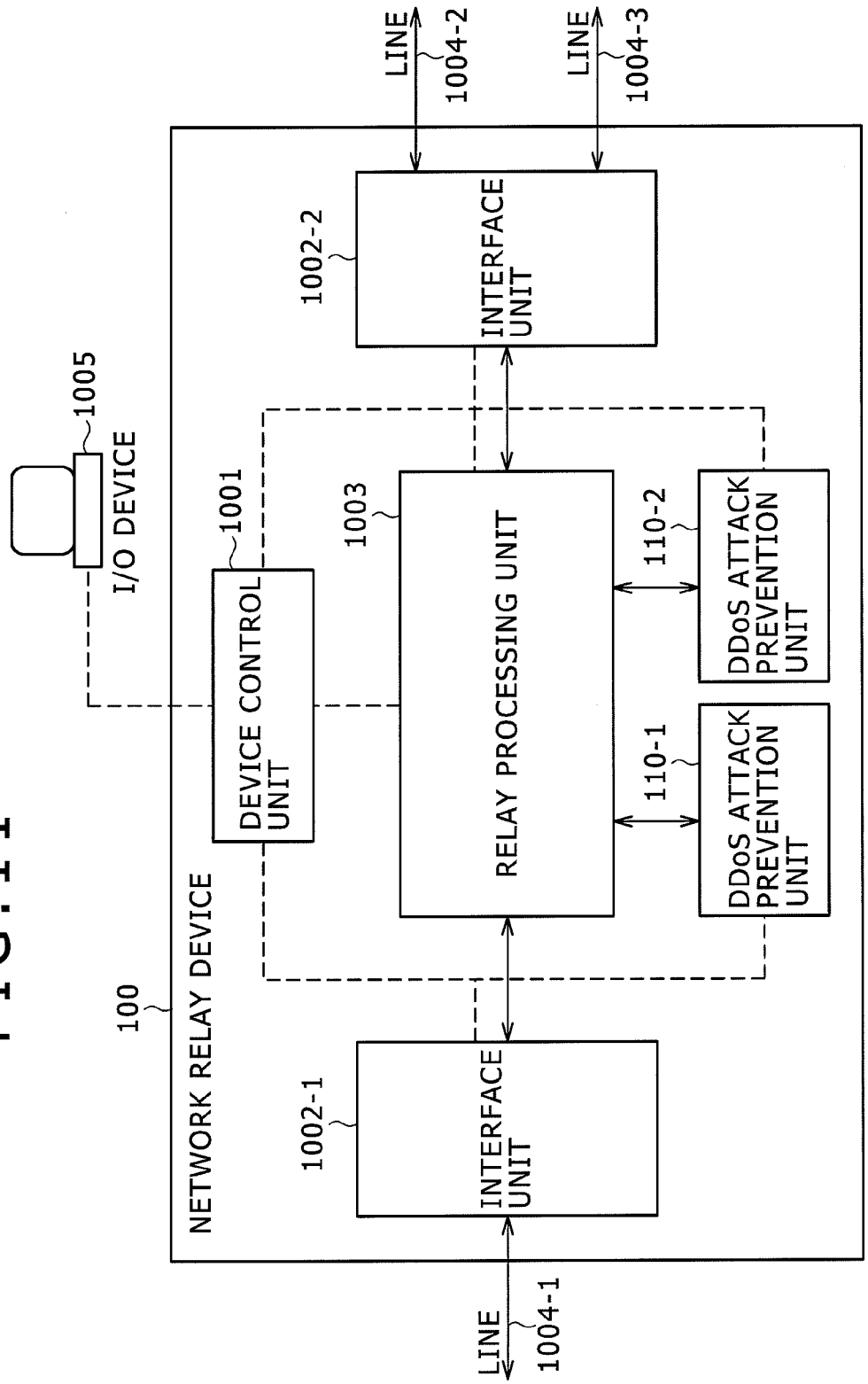
FIG. 11 is a block diagram illustrating a configuration of a network relay device according to another embodiment of the present invention.

FIG. 11 is a diagram illustrating a configuration of the network relay device 100 according to another embodiment of the present invention. In the figure, the network relay device 100 includes the one or more DDoS attack prevention units 110, a device control unit 1001 that controls the overall network relay device 100, interface units 1002 that are each connected to one or more lines 1004, and transmit or receive the packets with respect to another device on the network, a relay processing unit 1003 that forwards the packets between one or more of the interface units 1002 and the DDoS attack prevention unit, and an I/O device 1005 for allowing the manager to set the network relay device 100 and manage the operation according to another embodiment of the present invention.

In a configuration example of FIG. 11, the multiple interface units 1002, the multiple DDoS attack prevention units 110, and the multiple lines 1004 are provided. If those units need to be distinguished from each other in the following description, the two interface units 1002 are distinguished by reference numerals 1002-1 and 1002-2, the two DDoS attack prevention units 110 are distinguished by reference numerals 110- and 110-2, and the three lines 1004 are distinguished by reference numerals 1004-1, 1004-2, and 1004-3. Also, in the figure, solid arrows indicate that the respective configuration elements are connected by signal lines for allowing the packets to flow in their directions, and dashed lines indicate that the respective configuration elements are connected by signal lines for allowing the control information other than the packets to flow.

Figure 12:
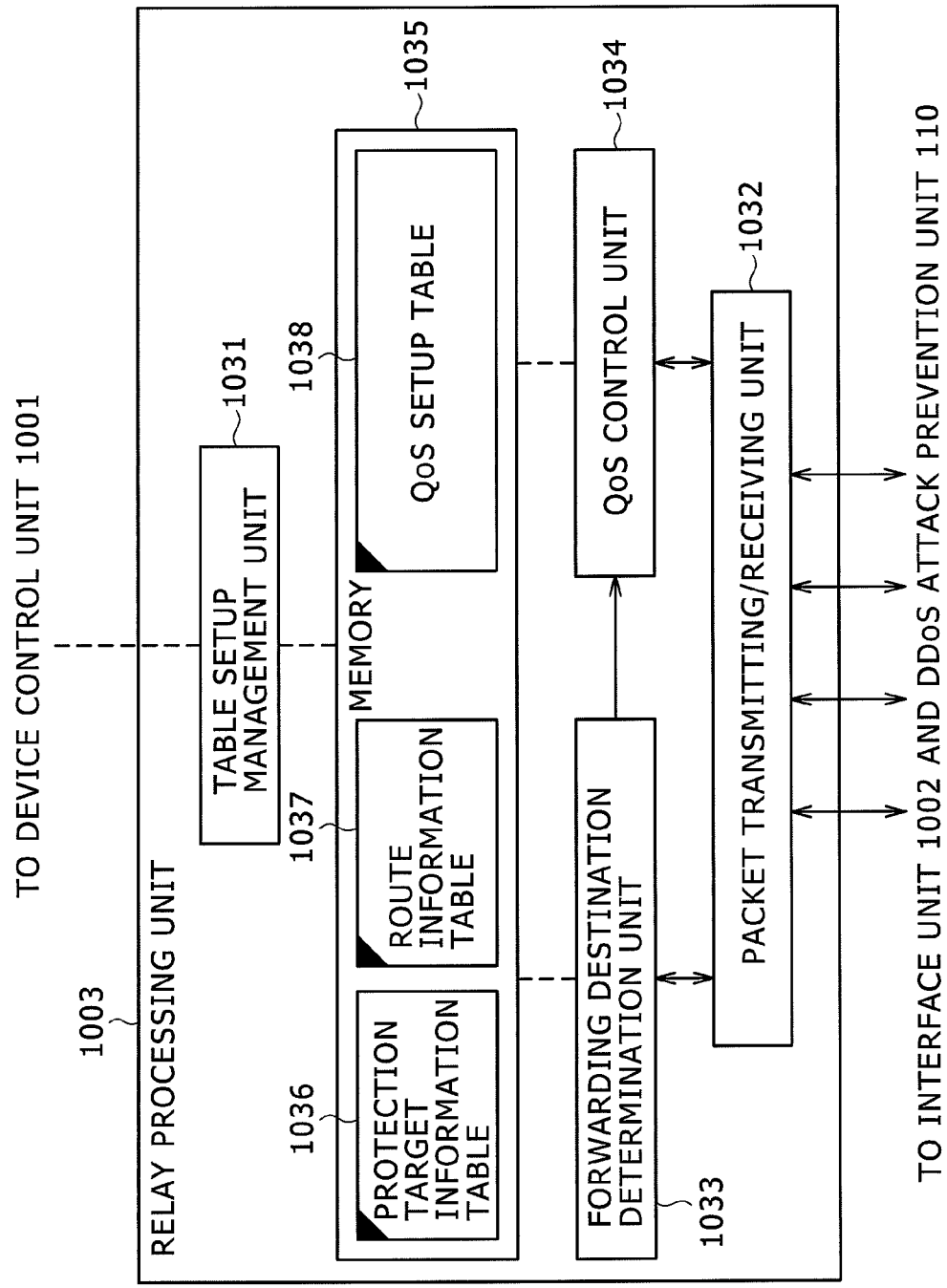
FIG. 12 is a block diagram illustrating a configuration of a relay processing unit.

FIG. 12 is a diagram illustrating a configuration of the relay processing unit 1003 which is a constituent element of the network relay device 100. In the figure, the relay processing unit 1003 includes a packet transmitting/receiving unit 1032 that transmits or receives the packets between the interface units 1002 and the DDoS attack prevention units 110, a forwarding destination determination unit 1033 that determines the interface units 1002 or the DDoS attack prevention units 110 which are the forwarding destination of the packets, a QoS control unit 1034 for controlling the QoS control on the packet whose forwarding destination is determined by the forwarding destination determination unit 1033, a memory 1035 for storing a variety of setting tables necessary for the operation of the relay processing unit therein, and a table setup management unit 1031 that writes or reads the setup information with respect to the respective tables within the memory 1035. The memory 1035 includes a protection target information table 1036 that stores information necessary to identify the packet for the resource to be protected therein, a route information table 1037 that stores information necessary to determine the forwarding destination of the packets between the lines 1004 therein, and a QoS setup table 1038 that stores information related to the QoS control therein. The meanings of the solid arrows and the dashed lines are identical with those described in FIG. 11.

Figure 13:
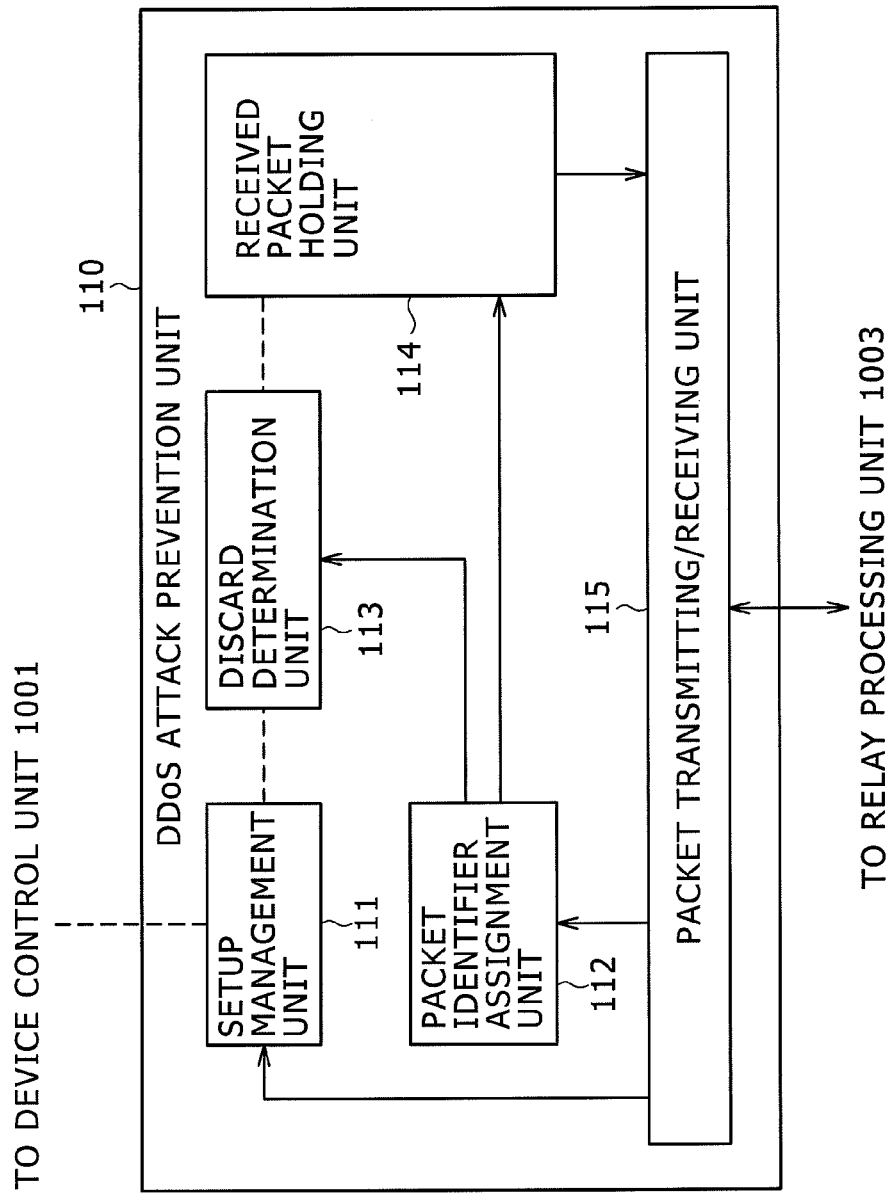
FIG. 13 is a block diagram illustrating a configuration of a DDoS attack prevention unit according to another embodiment of the present invention.

FIG. 13 is a diagram illustrating a configuration of each DDoS attack prevention unit 110 which are constituent elements of the network relay device 100. In the figure, the DDoS attack prevention unit 110 includes a packet transmitting/receiving unit 115 for transmitting or receiving the packets with respect to the relay processing unit 1003, the packet identifier assignment unit 112 that assigns an identifier for internal processing to the packet received by the packet transmitting/receiving unit 115, the discard determination unit 113 that determines whether the packet is discarded, or not, the received packet holding unit 114 for temporarily holding the packets until the discard determination result of the packet is output from the discard determination unit 113, and the setup management unit 111 that sets up and manages the information required by the discard determination unit 113. Among those constituent elements, the packet identifier assignment unit 112, the discard determination unit 113, and the received packet holding unit 114 are identical with the constituent elements in the embodiment described with reference to FIG. 1. Also, the packet identifier assignment unit 112 has a function of reading information on a priority determination status internally held in the discard determination unit 113 and the determined discard rate of the packet according to an instruction from the device control unit 1001, in addition to a function provided by the packet identifier assignment unit 112 in the embodiment described with reference to FIG. 1.

Subsequently, the operation of the network relay device 100 configured as described above will be described with reference to FIGS. 19 and 20.

FIG. 19 is a sequence diagram illustrating a basic operation of the network relay device 100. This sequence diagram illustrates the operation when the network relay device 100 relays the packet for the server to be protected, which is received from the line 1004-1 on the basis that, in FIG. 11, an end of the line 1004-1 is connected with a terminal that accesses to the server which is the resource to be protected, and ends of the line 1004-2 and the line 1004-3 are connected with the respective servers to be protected.

First, the interface unit 1002-1 receives an IP packet 1901 from the line 1004-1, the interface unit 1002-1 executes packet receiving processing S1902.

Figure 17:
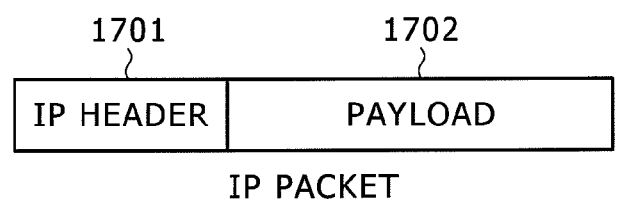
FIG. 17 is an illustrative view illustrating an outline format of an IP packet transmitted or received on a line.

FIG. 17 is a diagram illustrating a format of the IP packet. The IP packet 1901 is also configured by an IP header 1701 that stores information necessary to relay the IP packet therein, and a payload 1702 that stores a data body therein as illustrated in FIG. 17.

In S1902, the interface unit 1002-1 adds, to the IP packet 1901, an internal extended header that stores information indicating that the source is the interface unit 1002-1 therein, and forwards the IP packet 1901 to the relay processing unit 1003. The packet added with the internal extended header is an internal extended IP packet 1903.

Figure 18:
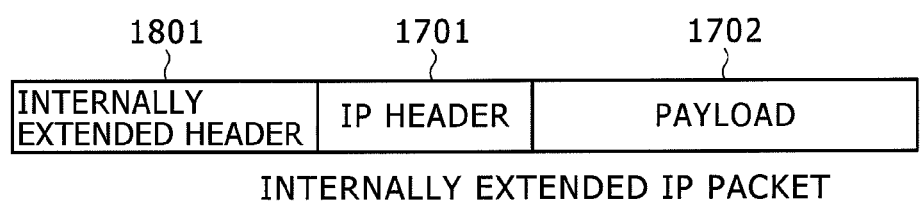
FIG. 18 is an illustrative view illustrating an outline format of an IP packet when forwarding the IP packet within the relay processing unit.

FIG. 18 illustrates a format of the internal extended IP packet.

When the relay processing unit 1003 receives the internal extended IP packet 1903, the relay processing unit 1003 executes packet relay processing S1904.

FIG. 20 is a flowchart illustrating the packet relay processing in detail.

In this case, a description will be given of the processing until a relay destination of the internal extended IP packet 1903 is determined in S1904. The internal extended IP packet 1903 is received by the packet transmitting/receiving unit 1032 within the relay processing unit 1003, and transmitted to the forwarding destination determination unit 1033 to start the processing according to the flowchart of FIG. 20.

First, the forwarding destination determination unit 1033 confirms the source of the packet from an internal extended header 1801 of the internal extended IP packet 1903 (S2001). In this example, since the source is the interface unit 1002-1, it is determined that the source is not the DDoS attack prevention unit, and the processing proceeds to step S2002.

In step S2002, the forwarding destination determination unit 1033 retrieves the protection target information table 1036 on the basis of the information included in the IP header 1701 and the payload 1702 within the internal extended IP packet 1903.

FIG. 14 illustrates a format of the protection target information table 1036. In this embodiment, the packet for the resource to be protected is specified by the combination of the respective information on the destination IP address, the destination port No., the source IP address, the source port No., and a protocol, which are included in the IP header and the payload of the packet. As an example, it is assumed that the destination IP address included in the IP header 1701 within the internal extended IP packet 1903 is 10.0.1.1, the destination port No. is 80, and the protocol is TCP. In this situation, since an entry 10361 of the protection target information table 1036 illustrated in FIG. 14 matches the above example, the determination in step S2002 is yes, and the processing proceeds to step S2005. In step S2005, the forwarding destination determination unit 1033 stores the DDoS attack prevention unit 110-1 shown in a processing module section of the entry 10361 in the internal extended header 1801 of the internal extended IP packet 1903 as a subsequent forwarding destination (as an internal extended IP packet 1905), and forwards the internal extended IP packet 1905 to the packet transmitting/receiving unit 1032. Then, the packet transmitting/receiving unit 1032 forwards the internal extended IP packet 1905 to the DDoS attack prevention unit 110-1 with reference to the internal extended header 1801 of the internal extended IP packet 1905 (S2009).

If the information included in the IP header 1701 within the internal extended IP packet 1903 matches the packet conditions for the protection target in an entry 10362 in the protection target information table 1036, the DDoS attack prevention unit 110-2 is stored in the internal extended header 1801 of the internal extended IP packet 1903 as a subsequent forwarding destination. With the above operation, the processing is distributed to any one of the multiple DDoS attack prevention units 110 for each of the resources to be protected to enhance the overall throughput.

Returning to FIG. 19, through the processing of step S1904 described above, the internal extended IP packet 1903 forwarded to the relay processing unit 1003 is forwarded to the DDoS attack prevention unit 110-1 as the internal extended IP packet 1905, and the DDoS attack prevention unit 110-1 executes DDoS attack prevention processing S1906.

In step S1906, the packet transmitting/receiving unit 115 receives the internal extended IP packet 1905, and forwards the internal extended IP packet 1905 to the packet identifier assignment unit 112. Subsequently, the communication history management, the discard rate determination, and the discard processing based on the determined discard rate are conducted on the internal extended IP packet 1905 by the respective processing units of the packet identifier assignment unit 112, the discard determination unit 113, and the received packet holding unit 114. The processing contents are identical with the processing described above with reference to FIGS. 1 to 3 and 5 to 10, and therefore their description will be omitted. As a result of this processing, if it is determined that the internal extended IP packet 1905 is not discarded, the packet transmitting/receiving unit 115 receives the internal extended IP packet 1905 that has not been discarded from the received packet holding unit 114, stores information that the source of the packet is the DDoS attack prevention unit 110-1 in the internal extended header 1801 of the internal extended IP packet 1905 (as an internal extended IP packet 1907), and forwards the information to the relay processing unit 1003.

The relay processing unit 1003 that has received the internal extended IP packet 1907 executes the packet relay processing as step S1908. Like step S1904, the internal extended IP packet 1907 is received by the packet transmitting/receiving unit 1032 within the relay processing unit 1003, and transmitted to the forwarding destination determination unit 1033 to start the processing according to a flowchart of FIG. 20.

First, the forwarding destination determination unit 1033 confirms the source of the packet from the internal extended header 1801 of the internal extended IP packet 1907 (S2001). In this example, since the source is the DDoS attack prevention unit 110-1, the processing skips step S2002, and proceeds to step S2003. The processing in step S2001 is to prevent the packet returned from the DDoS attack prevention unit 110 from being again forwarded to each of the DDoS attack prevention units 110.

Even if the determination in step S2002 is no, the processing proceeds to step S2003.

Then, in step S2003, the forwarding destination determination unit 1033 retrieves the route information table 1037 on the basis of the information included in the IP header 1701 of the internal extended IP packet 1907.

FIG. 15 illustrates a format of the route information table 1037. In this example, since the destination IP address included in the IP header 1701 within the internal extended IP packet 1907 is 10.0.1.1, an entry 10371 matches this address. Then, a forwarding destination module/output line 1002-2/1004-2 included in the matched entry 10371 is set for the internal extended header 1801 of the internal extended IP packet 1907, and the processing is delivered to the QoS control unit 1034.

The QoS control unit 1034 executes the QoS control on the internal extended IP packet 1907 as step S2007. How any packet is subjected to the QoS control is set in the QoS setup table 1038.

FIG. 16 illustrates a format of the QoS setup table. In this embodiment, the packet to be subjected to the QoS control is designated by the combination of the respective information on the output line included in the internal extended header of the packet, the destination IP address, the destination port No., the source IP address, the source port No., and the protocol, which are included in the IP header and the payload. Also, as the contents of the QoS control, there are, for example, a priority control that discards the packet on the basis of the priority designated in advance when a congestion occurs, and a bandwidth control that allows a specific packet to fall within an occupied bandwidth designated in advance.

The QoS control unit 1034 retrieves the QoS setup table 1038 on the basis of the contents of the internal extended IP packet 1907 in step S2007. As a result, since the output line is 1004-2, and the destination address is 10.0.1.0 in this example, an entry 10381 matches the above conditions. Therefore, the QoS control unit 1034 conducts the priority control on the priority of the packet when the congestion occurs, as a predetermined priority (S2008). Specifically, if no congestion occurs in the network relay device 100, the internal extended IP packet 1907 is relayed as it is. However, if the congestion occurs, when there is another packet having the priority equal to or higher than a predetermined priority, there is a possibility that another packet is relayed preferentially, and the internal extended IP packet 1907 is discarded. Conversely, the priority of another packet is smaller than the predetermined priority, the internal extended IP packet 1907 is forwarded preferentially under the control.

As a result of the QoS control in step S2008, if it is determined that the internal extended IP packet 1907 is relayed as it is, the packet is forwarded to the packet transmitting/receiving unit 1032, and forwarded to the forwarding destination (in this case, the interface unit 1002-2 that accumulates the line 1004-2 which is a relay destination therein) designated in the internal extended header 1801 in step S2009 as an internal extended IP packet 1909.

With the above operation, step S1908 in FIG. 19 is completed, and the interface unit 1002-2 that has received the internal extended IP packet 1909 extracts the internal extended header 1801 from the internal extended IP packet 1909, and also outputs an IP packet 1911 to the line 1004-2 designated in the internal extended header (the packet from which the internal extended header 1801 has been removed is set as the IP packet 1911). As a result, the IP packet 1911 finally arrives at the server that is the resource to be protected.

Through the above processing, the packet relay processing in the network relay device 100 is completed.

The network relay device 100 illustrated in FIG. 11 is described as a device that conducts the layer 3 relay for determining the relay destination according to the destination IP address of the packet. However, the network relay device

100 may be a device that conducts a layer 2 relay for determining the relay destination according to the MAC address included in a header of a layer 2 frame. In this case, the contents of the route information table 1037 and the processing contents of the forwarding destination determination unit 1033 are merely changed to conduct the layer 2 relay.

With the above operation, the description of the basic packet relay processing sequence of the network relay device 100 according to another embodiment of the present invention has been finished.

Subsequently, a relationship between the QoS control unit 1034 provided in the relay processing unit 1003 and the discard control provided in the DDoS attack prevention unit 110 will be supplemented.

The QoS control unit 1034 is similar to the DDoS attack prevention unit 110 in that the packet is discarded according to the circumstances. However, the QoS control unit 1034 and the DDoS attack prevention unit 110 definitely share the functions with each other. The QoS control unit 1034 realizes a large kinds of QoS control methods. However, a method of designating the packet to be controlled is basically designated on the so-called per flow basis on the basis of the information included in the IP header. However, from the viewpoints of the DDoS attack prevention, the packet to be discarded needs to be finely controlled on the per packet basis on the basis of the communication history. For that reason, if this control is to be conducted by a general QoS setup function such as the QoS setup table 1038, the dynamic addition and deletion of enormous entries are required, and this control is difficult to realize. The DDoS attack prevention unit 110 dynamically inhibits the service stop attack on the per packet basis under the fine discard control. On the other hand, if the packets determined to be normally communicated by a normal use in the DDoS attack prevention units 110, and hardly discarded causes the congestion in relationship to the number of other packets, the congestion is reduced by the control of the QoS control unit 1034. That is, there is an assignment of roles so that the QoS control unit 1034 controls the overall network relay device 100, and the DDoS attack prevention unit 110 controls the packet for the specific resource from the viewpoint of the DDoS attack prevention. The QoS control unit 1034 and the DDoS attack prevention unit 110 operate so as to function, individually, and optimally control as the system.

In the embodiment of FIG. 11, each of the DDoS attack prevention units 110 is mainly implemented by hardware. As a modified example, a module card incorporating a programmable processor therein is connected to the relay processing unit 1003 through an internal BUS (physical signal line), and the discard control conducted by the DDoS attack prevention units 110 may be configured by software. The module card may be configured, for example, as follows.

(1) A configuration in which the interface units 1002 and the DDoS attack prevention units 110 are connected to the relay processing unit 1003 through internal buses, and a signal is transmitted and received between the interface units 1002 and the DDoS attack prevention units 110 through the relay processing unit 1003.

(2) A configuration in which the interface units 1002, the DDoS attack prevention units 110, and the relay processing unit 1003 are implemented in a common internal bus, and the respective units transmit and receive the signals with respect to each other through the common internal bus. (In this case, the signal may be transmitted or received between the interface units 1002 and the DDoS attack prevention units 110 through the relay processing unit 1003, or the signal may be transmitted or received directly between the interface units 1002 and the DDoS attack prevention units 110.)

The operation of relaying the packet in the network relay device 100 is described above. The contents of the various tables necessary for the operation can be set or referred to by the network manager through the I/O device 1005 illustrated in FIG. 11, which will be described below.

The device control unit 1001 of the network relay device 100 is equipped with a user interface function (for example, a command line user interface is a graphical user interface using a web browser) for allowing the manager to set and refer to the tables held in the network relay device 100. The device control unit 1001 has an instruction function of transmitting the setup information for a designated table from the manager through the I/O device 1005 to the respective processing units to write the table, or forwarding the contents of the designated table from the respective processing units to the manager, to display the received information on the I/O device.

In more detail, when, for example, the table included in the relay processing unit 1003 is set and referred to, an instruction from the device control unit 1001 is received by the table setup management unit 1031 within the relay processing unit 1003, the instruction from the device control unit 1001 is received by the table setup management unit 1031 within the relay processing unit 1003, and the protection target information table 1036, the route information table 1037, and the QoS setup table 1038 are written or read according to the instruction, and the read information is sent to the device control unit 1001. Also, when the table included in the DDoS attack prevention units 110 is set and referred to, the instruction from the device control unit 1001 is received by the setup management unit 111 within the DDoS attack prevention units 110, and for example, the discard rate determination table 700 included in the discard rate determination unit 205 is set, or the communication history information within the communication history information memory 502 included in the history management unit 202 is read. Further, the read information is sent to the device control unit 1001.

With the above functions, the manager who operates the I/O device 1005 can set and manage the network relay device 100, and also collect information for confirming an operating condition related to the DDoS attack prevention.

When the function of the setup management unit 111 within the DDoS attack prevention units 110 is supplemented, the setup management unit 111 may be equipped with the function of the setup management by the control packet (123 in FIG. 1) described as the first embodiment, in addition to the setup management instructed by the above-mentioned device control unit 1001. In this case, the destination IP address of the control packet is the IP address (IP addresses different between the DDoS attack prevention units 110-1 and 110-2) assigned to the DDoS attack prevention units 110. When the control packet arrives at the network relay device 100, the IP header of the control packet is referred to in the processing within the relay processing unit 1003. If the destination IP address is the IP address of the DDoS attack prevention units 110, any one of the entries 10373 and 10374 of the route information table 1037 matches the IP address, and the control packet is forwarded to the DDoS attack prevention unit 110-1 or the 110-2. In the DDoS attack prevention unit 110-1 or the 110-2, the packet transmitting/receiving unit 115 confirms that the destination IP address of the control packet is for itself, and operates to forward the control packet to not the packet identifier assignment unit 112 but the setup management unit 111.

As described above, according to another embodiment of the present invention, the multiple DDoS attack prevention units is provided within the network relay device so that the load of the DDoS attack prevention processing can be distributed. For that reason, even when the number of resources to be protected, which can be processed by one DDoS attack prevention unit, is limited by the limitation of a hardware throughput or a memory capacity for holding the communication history information, there is advantageous in that the number of resources to be protected which can be handled by one network relay device can be increased.

6. Note

The present invention is not limited to the above-mentioned embodiments, but includes various modified examples. For example, in the above-mentioned embodiments, in order to easily understand the present invention, the specific configurations are described. However, the present invention does not always provide all of the configurations described above. Also, a part of one configuration example can be replaced with another configuration example, and the configuration of one embodiment can be added. with the configuration of another embodiment. Also, in a part of the respective configuration examples, another configuration can be added, deleted, or replaced.

The embodiment has been made to solve the above-mentioned problems, and therefore aims at dealing with the extensive DDoS attack patterns, and also dealing with the case in which an enormous number of sources generate the attack traffics.

An object of the embodiment is to realize a control for minimizing an adverse effect on the "normal" traffics even when an invalidation control of a distributed denial of service attack is implemented. According to the embodiment, there is provided a network relay device that determines a priority of a received packet according to information on the received packet that arrives at a resource which is a protection target, and discards the received packet at a discard rate corresponding to the priority of the received packet and a load state of the projection target. In this embodiment, the priority of the received packet determines the priority so that "normal" traffics become high in the priority, and the attack packets become low.

More specifically, in all (or multiple) communications that arrive at the protection target such as a server possible to be attacked among communications forwarded by the subject network relay device, communication history information is recorded to determine the priority for each of the received packets that arrive at the protection target. In a state where a load of the resource to be protected is low, forwarding processing is implemented on all of the received packets. In a state where the load of the resource to be protected is high, forwarding or discard determination of the packet is implemented on the basis of the discard rate set for each of the priorities. Further, the discard rate set for each of the priorities has a discard rate set for each of the priorities for each level of the load state which is obtained by determining the load state of the resource to be protected in levels.

According to one aspect of the present invention, a network relay device includes:

a received packet holding and forwarding unit that holds a received packet while determining whether the received packet is forwarded, or not;

a discard determination unit that determines whether the received packet is forwarded, or discarded;

a received packet analysis determination unit that determines whether the received packet arrives at a resource which is a protection target as an element of the discard determination unit, or not, and extracts information for specifying a user according to information on the received packet if the received packet arrives at the protection target;

a history management unit that retrieves and updates a communication history for each user according to the information on the received packet obtained from the received packet analysis determination unit;

a priority determination unit that determines a priority of the received packet on the basis of a communication history for each user obtained from the history management unit;

a load determination unit that determines a load state of the protection target on the basis of the load information;

a discard rate determination unit that determines a discard rate of the received packet according to the priority of the received packet obtained from the priority determination unit and the load state obtained from the load determination unit; and a packet discard unit that implements a forwarding or discard determination of the packet on the basis of the discard rate of the received packet obtained from the discard rate determination unit, in which the priority of the received packet is determined on the basis of communication history information recorded on a per user basis of the resource to be protected.

In the network relay device, as the communication history information recorded on the per user basis, multiple measurement counters different in measurement time may be provided, and the measurement counters different in the measurement time may be compared with each other to detect a fluctuation of the traffic and determine the priority of the received packet. 13 measurement counters having five minute intervals may be provided to measure a change in traffic for past one hour or longer. In addition, six measurement counters having one hour intervals may be provided to measure a change in traffic for past six hours. Also, four measurement counters having six hour intervals, and seven measurement counters having 24 hour intervals may be provided to extend measurement times to past 24 hours and past one week, respectively. In the above-mentioned case, from the relationship of the number of counters, the counter updated as needed at the time of measuring the reception time can be set to only one measurement counter having five minute intervals. The measurement counter measures not only the traffic such as the number of packets or the number of bytes, but also the number of connection establishments with the protection target, the number of connection non-establishments that "connection establishment processing has been started, but connection has not been established for some reason", the number of received packets of a type not falling under a service provided by the protection target, or the number of packets corresponding to a specific attack pattern which is known to be frequently used by the DDoS attack, such as Syn packets of the TCP or packets including a Get request of HTTP. In the network relay device, a communication state for each user may be recorded as communication history information recorded on the per user basis. Information in determination of the priority of the received packet may be provided by recording a latest received packet reception time in each communication history information, and recording a connection establishment state in a connection oriented communication such as the TCP.

In the network relay device, information for each user may be notified from the protection target as the communication history information recorded on the per user basis. In a service of the e-commerce or an online game, in most cases, the user inputs a user ID and a password to the server, and logs in the server to use the service. Information on a login state or the user ID may be notified from the server, and recorded as the communication history information on the per user basis.

In the network relay device, when the priority is determined according to the communication history information recorded on the per user basis, the priority of the received packet may be determined according to multiple determination results.

In the network relay device, the communication history information recorded on a specific assembly basis which is different from the per user basis, such as the IP address or the user ID basis may be recorded. As a result, the priority of the received packet may be determined according to one or more determination results determined from the communication history information recorded on the specific assembly basis, in addition to the communication history information recorded on the per user basis.

In the network relay device, the communication history information recorded for all of the communications that arrive at the resource to be protected may be recorded. As a result, the priority of the received packet may be determined according to one or more determination results determined from the communication history information recorded for all of the communications that arrive at the resource to be protected, in addition to the communication history information recorded on the per user basis.

In the network relay device, the priority of the received packet may be determined according to one or more determination results determined from information obtained by analyzing the received packet, in addition to a part or all of the communication history information on the per user basis, the specific assembly basis, and for all of the communications that arrive at the resource to be protected.

In the network relay device, the communication history on the per user basis, and the communication history on the specific assembly basis may be added or deleted on an entry basis.

In the network relay device, the priority of the received packet determined according to the communication history information does not become a maximum value or a minimum value when the communication history information is newly added, but may be increased or decreased by updating the communication history information.

In the network relay device, in managing the communication history information, the packet exchanged for each communication may be analyzed to record the establishment state of the connection. The connection state of the TCP or a state of the packet where the IP fragmentation is implemented may be recorded.

In the network relay device, network environments of the resource to be protected and the service to be provided may be recognized. As a result, an advanced packet analysis technique also intended for information on an application such as a DPI (deep packet inspection), which is originally difficult to implement because of a large number of variations, can be also relatively easily realized by the combination of the network environments and the service.

In the network relay device, even when the communication of the received packet is encrypted, a common key and a private key may be managed for each user to compound ciphers. As a result, the advanced packet analysis function can be realized for the received packet.

In the network relay device, a network traffic load such as the number of packets and the number of bytes which arrive at the resource to be protected may be measured so that a function for determining the load state can be realized. Also, when the protection target is a server, the load state may be determined by measuring the number of connections or the number of sessions, or the load state may be determined by measuring a response speed of the server.

In the network relay device, load information for determining the load state of the protection target may be notified from the resource to be protected or an external resource load monitoring device.

In the network relay device, when the priority of the received packet is determined according to multiple determination results in determining the priority from the communication history, significance for each of the determination results may be changed even when the network relay device is operating. As a result, an effective countermeasure could be studied and implemented by trial and error even if the resource to be protected is being attacked.

In the network relay device, when the discard rate is determined according to the priority of the received packet and the load state of the protection target, a value of the discard rate corresponding to the priority of the received packet and the load state of the protection target may be changed even when the network relay device is operating. As a result, an effective countermeasure could be studied and implemented by trial and error even if the resource to be protected is being attacked.

The embodiment is different from a system in which the attack pattern is determined to discard a communication falling under the attack pattern. In the embodiment, in a state where the load of the resource to be protected is low, the forwarding processing is implemented on the users low in the priority including the attacker to record the communication history. In a state where the load of the resource to be protected is high, the priority of the communication is determined on the per user basis according to the communication history accumulated by recording and the received packet to discard the communications low in the priority at a high ratio. The communications high in the priority are forwarded at the high rate, and the communications low in the priority are preferentially discarded to reduce the load of the resource to be protected. With this configuration, the service stop state in the high load state, which is induced by the DDoS attack, can be avoided.

The DDoS attack can be mainly regarded as an action that the system resource within the device which is the resource to be protected is excessively consumed to generate a high load state, and the resource to be protected is transmitted to a service stop state.

The embodiment suppresses the occurrence of the high load state to avoid the service stop state with the remarkable advantages of solving "the problem that there is no sufficient technique of coping with the advanced DDoS attack in the related art", and also solving "the problem that the "normal" traffic is erroneously determined as the attack pattern, and adversely affected, which occurs in association with the determination of the attack pattern which frequently occurs in the related art".

Also, parts or all of the above-described respective configurations, functions, processors, processing means may be realized, for example, as an integrated circuit, or the hardware.

Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

What is claimed is:

1. A network system comprising:
a server that has a resource to be protected, and configured to provide a service; and,
a network relay device which includes an interface unit that is connected to one or more lines, and is configured to transmit or receive a packet with respect to a terminal and the server through a network,
a relay hardware processor configured to conduct a first discard control for forwarding or discarding the packet on the basis of information included in a header of the received packet,
a priority determination hardware processor configured to determine a priority of the received packet;
a load determination hardware processor configured to determine a load state of the resource to be protected, on the basis of the load information, and,
a DDoS attack prevention hardware processor configured to conduct a second discard control for forwarding or discarding the packet on a per packet basis on the basis of both the priority of the received packet and the load state of the resource to be protected,
wherein:
the network relay device includes a discard determination hardware processor configured to determine whether the received packet is to be forwarded or discarded,
wherein the discard determination hardware processor includes:
a received packet analysis hardware processor configured to determine whether the received packet is a packet which arrives at the resource to be protected, or not, and extract user identification information for specifying a user from the received packet if it is determined that the received packet is the packet which arrives at the resource to be protected;
a history management hardware processor configured to prepare and record the communication history on the per user basis from the user identification information of the received packet obtained from the received packet analysis hardware processor, and retrieve and update the communication history recorded on the per user basis;
a discard rate determination hardware processor configured to determine a discard rate of the preset received packet according to the priority of the received packet obtained from the priority determination hardware processor, and the load state obtained from the load determination hardware processor: and
a packet discard hardware processor configured to implement a forwarding or discard determination of the packet on the basis of the discard rate of the received packet obtained from the discard rate determination hardware processor,
wherein the discard control of the received packet is implemented according to the forwarding or discard determination by the discard determination hardware processor, wherein the discard control of the received packet is implemented according to the forwarding or discard determination by the discard determination hardware processor, wherein the priority determination hardware processor is configured to determine a priority of the received packet according to a preset determination criterion on the basis of the communication history recorded on the per user basis obtained from the history management hardware processor, wherein the load determination hardware processor is configured to determine a load state of the resource to be protected, on the basis of the load state due to the communication history recorded on the per user basis, or the load state notified from others.

2. A network system according to claim 1,
wherein when the relay hardware processor is configured to determine that a source of the received packet is not the DDoS attack prevention hardware processor, the relay hardware processor retrieves a protection target information table in which a processing module is stored for header information, and forwards the received packet to any of the DDoS attack prevention hardware processor corresponding to the processing module on the basis of the header information of the received packet, and the DDoS attack prevention hardware processor executes the second discard control, and
wherein when the relay hardware processor is configured to determine that a source of the received packet is the DDoS attack prevention hardware processor, the relay hardware processor executes the first discard control under a QoS control or another filter control.

3. A network system according to claim 2,
wherein when the relay hardware processor is configured to determine that the source of the packet is not the DDoS attack prevention hardware processor, the relay hardware processor retrieves a protection target information table in which the processing module is stored for the header information, and if there is no entry corresponding to the header information of the received packet, the relay hardware processor executes the first discard control under the QoS control or another filter control.

4. A network system according to claim 1, further comprising:
a packet identifier assignment circuit configured to assign a packet ID independent from at least three kinds of received packets including the received packet which is output to a line within a device through which a packet for the resource to be protected passes, the received packet input from the line within the device through which the packet for the resource to be protected passes, and a control packet; and
a received packet holding circuit configured to hold the three kinds of received packets, and forward or discard the received packet from the packet identifier assignment circuit on the basis of a determination result of the discard determination unit,
wherein the discard determination hardware processor is configured to output the determination result of the forwarding or discard determination of the received packet to the received packet holding unit on the basis of the received packet and the packet ID from the packet identifier assignment circuit.

5. A network system according to claim 1, further comprising: a setup management circuit configured to manage the setup of a variety of tables within the discard determination hardware processor.

6. A network system according to claim 1,
wherein as the communication history recorded on the per user basis, a plurality of measurement counters each having a different measurement time is provided, the history management hardware processor is configured to record the communication state for each user, and/or notify a part or all of the communication states for each user.

7. A network system according to claim 1,
wherein the priority determination hardware processor is configured to determine the priority of the received packet according to a plurality of determination results of the communication history recorded on the per user basis.

8. A network system according to claim 7,
wherein the history management hardware processor is further configured to record the communication history on a specific assembly basis, and
wherein the priority determination hardware processor is configured to determine the priority of the received packet according to one or more determination results determined from the communication history recorded on the specific assembly hardware processor, in addition to the communication history recorded on the per user basis.

9. A network system according to claim 8,
wherein the history management hardware processor is further configured to record the communication histories of all of communications that arrive at the resource to be protected, and
wherein the priority determination hardware processor is configured to determine the priority of the received packet according to one or more determination results determined from the communication histories recorded for all of the communications that arrive at the resource to be protected, in addition to the communication history recorded for the per user unit and the communication history recorded on the specific assembly hardware processor.

10. A network system according to claim 1,
wherein the history management hardware processor is configured to add or delete the communication history on the per user basis, and
wherein the priority determination hardware processor is configured to determine the priority of the received packet according to the communication history and the user identification information on the received packet.

11. A network relay method in a network system including a server that has a resource to be protected and provides a service, a network that is connected with one or a plurality of terminals, and a network relay device that connects the server to the network in which the terminal accesses to the server through the network and the network relay device,
comprising the steps of:
by the network relay device,
receiving a packet with respect to a terminal and the server through a network;
conducting a first discard control for forwarding or discarding the packet on the basis of information included in a header of the received packet by the step of receiving;
determining a priority of the received packet;
determining a load state of the resource to be protected, on the basis of the load information;
conducting a second discard control for forwarding or discarding the packet on a per packet basis on the basis of both the priority of the receive packet and the load state of the resource to be protected;
determining whether the received packet is to be forwarded or discarded,
determining whether the received packet is a packet which arrives at the resource to be protected, or not, and extracting user identification information for specifying a user from the received packet if it is determined that the received packet is the packet which arrives at the resource to be protected;
preparing and recording the communication history on the per user basis from the user identification information of the received packet obtained, and retrieving and updating the communication history recorded on the per user basis;
determining a discard rate of the preset received packet according to the priority of the received packet obtained and the load state obtained: and
implementing a forwarding or discard determination of the packet on the basis of the discard rate of the received packet obtained,
wherein the discard control of the received packet is implemented according to the forwarding or discard determination, wherein the discard control of the received packet is implemented according to the forwarding or discard determination,
determining a priority of the received packet according to a preset determination criterion on the basis of the communication history recorded on the per user basis obtained,
determining a load state of the resource to be protected, on the basis of the load state due to the communication history recorded on the per user basis, or the load state notified from others: and
transmitting, to a network, a packet to be forwarded by a step of conducting the second discard control.

12. A network relay device that is connected to a terminal through a server having a resource to be protected and providing a service to the terminal, and a network, the network relay device comprising:
an interface hardware processor that is connected to one or more lines and configured to transmit or receive a packet with respect to the network;
a relay hardware processor configured to conduct a first discard control for forwarding or discarding the packet on the basis of information included in a header of the received packet;
a priority determination hardware processor configured to determine a priority of the received packet;
a load determination hardware processor configured to determine a load state of the resource to be protected, on the basis of the load information; and
a DDoS attack prevention hardware processor configured to conduct a second discard control for forwarding or discarding the packet on a per packet basis on the basis of both the priority of the received packet and the load state of the resource to be protected
wherein:
the network relay device includes a discard determination hardware processor configured to determine whether the received packet is to be forwarded or discarded,
wherein the discard determination hardware processor includes:
a received packet analysis hardware processor configured to determine whether the received packet is a packet which arrives at the resource to be protected, or not, and extract user identification information for specifying a user from the received packet if it is determined that the received packet is the packet which arrives at the resource to be protected:
a history management hardware processor configured to prepare and record the communication history on the per user basis from the user identification information of the received packet obtained from the received packet analysis hardware processor, and retrieve and update the communication history recorded on the per user basis:

a discard rate determination hardware processor configured to determine a discard rate of the preset received packet according to the priority of the received packet obtained from the priority determination hardware processor, and the load state obtained from the load determination hardware processor: and a packet discard hardware processor configured to implement a forwarding or discard determination of the packet on the basis of the discard rate of the received packet obtained from the discard rate determination hardware processor, wherein the discard control of the received packet is implemented according to the forwarding or discard determination by the discard determination hardware processor, wherein the discard control of the received packet is implemented according to the forwarding or discard determination by the discard determination hardware processor, wherein the priority determination unit is configured to determine a priority of the received packet according to a preset determination criterion on the basis of the communication history recorded on the per user basis obtained from the history management hardware processor, wherein the load determination hardware processor is configured to determine a load state of the resource to be protected, on the basis of the load state due to the communication history recorded on the per user basis, or the load state notified from others.

13. A network relay device according to claim 12, wherein the DDoS attack prevention hardware processor includes a plurality of the DDoS attack prevention hardware processors, and wherein the network relay device further comprises:

a table configured to hold information for associating the resource to be protected with the DDoS attack prevention hardware processor; and a forwarding destination determination hardware processor configured to determine any of the DDoS attack prevention hardware processors for conducting the discard determination processing on the packet with reference to the association information on the basis of the table.

14. A network relay device according to claim 12, further comprising:

a device control circuit that is connected to an I/O device configured to set or refer to information stored within the network relay device, wherein the communication history can be referred to by the I/O device.

15. A network system according to claim 1, wherein the DDoS attack prevention hardware processor further includes a history management hardware processor configured to record communication history on the per user basis from the user identification information of the received packet obtained, and retrieve and update the communication history recorded on the per user basis, and wherein the priority determination hardware processor is configured to determine a priority of the received packet on the basis of the communication history recorded on the per user basis obtained from the history management hardware processor.

16. A network relay method according to claim 11, further comprising a step of:

recording communication history on the per user basis from the user identification information of the received packet obtained, and retrieving and updating the communication history recorded on the per user basis, and, wherein a priority of the received packet is determined based on the recorded communication history.

17. A network relay device according to claim 12, wherein the DDoS attack prevention hardware processor further includes a history management hardware processor configured to record a communication history on the per user basis from the user identification information of the received packet obtained, and retrieve and update the communication history recorded on the per user basis, and, wherein the priority determination hardware processor is configured to determine a priority of the received packet on the basis of the communication history recorded on the per user basis obtained from the history management hardware processor.

* * * * *